US012787908B2

(12) United States Patent
Morimoto et al.

(10) Patent No.: US 12,787,908 B2
(45) Date of Patent: Nov. 10, 2026

(54) AGRICULTURAL WORK ASSISTANCE SYSTEM AND AGRICULTURAL MACHINE

(71) Applicant: Kubota Corporation, Osaka (JP)

(72) Inventors: Takanori Morimoto, Sakai (JP); Kotaro Yamaguchi, Sakai (JP); Kenji Tamatani, Sakai (JP); Ken Sakuta, Sakai (JP); Fumiya Yoshimura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 328 days.

(21) Appl. No.: 18/742,505

(22) Filed: Jun. 13, 2024

(65) Prior Publication Data

US 2024/0324487 A1 Oct. 3, 2024

Related U.S. Application Data

(63) Continuation of application No. PCT/JP2022/040138, filed on Oct. 27, 2022.

(30) Foreign Application Priority Data

Dec. 28, 2021 (JP) ................................ 2021-214366

(51) Int. Cl.

| | |
|---|---|
| ***A01B 79/00*** | (2006.01) |
| ***A01B 69/00*** | (2006.01) |
| ***A01B 69/04*** | (2006.01) |

(52) U.S. Cl.

CPC .......... *A01B 79/005* (2013.01); *A01B 69/008* (2013.01)

(58) Field of Classification Search

CPC ....... A01B 69/00; A01B 69/008; A01B 79/00; A01B 79/005; A01B 63/111;

(Continued)

(56) References Cited

U.S. PATENT DOCUMENTS

| | | | |
|---|---|---|---|
| 8,322,482 B2 | 12/2012 | Sprinkle et al. | |
| 2018/0164797 A1* | 6/2018 | Meiners ............... | G05D 1/0011 |

(Continued)

FOREIGN PATENT DOCUMENTS

| | | | |
|---|---|---|---|
| DE | 102018001292 A1 | 9/2018 | |
| JP | 2007-252320 A | 10/2007 | |
| JP | 2020-031565 A | 3/2020 | |

OTHER PUBLICATIONS

Official Communication issued in International Patent Application No. PCT/JP2022/040138, mailed on Dec. 13, 2022.

(Continued)

*Primary Examiner* — Robert E Pezzuto

(74) *Attorney, Agent, or Firm* — Keating & Bennett, LLP

(57) ABSTRACT

In an agricultural work assistance system, a coupler couples a working device to an agricultural machine. A controller is configured or programmed to control automatic traveling or steering of the agricultural machine to enable the working device to perform agricultural work on an agricultural field. A first operating device in the agricultural machine is operable to cause the working device to work. A second operating device outside the agricultural machine is operable to cause the working device to work. A first detector is operable to detect whether a user is on the agricultural machine. While the first detector detects the user on the agricultural machine, the working device can work according to operation of the first operating device and operation of the second operating device is disabled. While the first detector detects no user on the agricultural machine, the working device can work according to operation of the second operating device and operation of the first operating device is disabled.

15 Claims, 21 Drawing Sheets

(58) Field of Classification Search
CPC .......... A01B 63/118; B60D 1/36; B60D 1/62; G05D 1/648; G05D 1/646; G05D 1/6484; G05D 1/6987
See application file for complete search history.

(56) References Cited

U.S. PATENT DOCUMENTS

2021/0337715 A1 11/2021 Fujimoto
2022/0350991 A1* 11/2022 Vesperman .......... A01B 69/001

OTHER PUBLICATIONS

Official Communication issued in corresponding European Patent Application No. 22915501.5, mailed on Oct. 31, 2025, 12 pages.

* cited by examiner

AGRICULTURAL WORK ASSISTANCE SYSTEM AND AGRICULTURAL MACHINE

CROSS REFERENCE TO RELATED APPLICATIONS

This application is a continuation application of International Application No. PCT/JP2022/040138, filed on Oct. 27, 2022, which claims the benefit of priority to Japanese Patent Application No. 2021-214366, filed on Dec. 28, 2021. The entire contents of each of these applications are hereby incorporated herein by reference.

BACKGROUND OF THE INVENTION

1. Field of the Invention

The present invention relates to agricultural machines that each perform agricultural work while traveling in an agricultural field, and agricultural work assistance systems that each assist the agricultural machine in performing agricultural work.

2. Description of the Related Art

Japanese Unexamined Patent Application Publication No. 2020-31565 discloses a technique of assisting an agricultural machine in performing agricultural work by a working device coupled to the agricultural machine while allowing the agricultural machine (working vehicle) to automatically travel in an agricultural field. The automatic traveling system disclosed in Japanese Unexamined Patent Application Publication No. 2020-31565 includes an automatic traveling unit that enables automatic traveling (automatic driving) of an agricultural machine and a remote operating device that enables remote operation of the agricultural machine by wireless communication. The agricultural machine includes a work height setter that sets a work height of a working device, a height detector that detects a height position of the working device, a raising/lowering instructor, and a raising/lowering controller. The raising/lowering controller sets a control target height of the working device to the work height on the basis of an instruction from the raising/lowering instructor, and performs automatic raising/lowering control for causing the height position of the working device to match the work height. The remote operating device includes a display device and a work height adjuster that enables manual adjustment of the work height in an automatic traveling mode of the agricultural machine. The display device includes a work height display that displays the work height set by the work height setter, the work height adjusted by the work height adjuster, and the height position of the working device detected by the height detector.

SUMMARY OF THE INVENTION

For example, in a case where a working device coupled to an agricultural machine is operable both by an operating device provided in or on the agricultural machine and by an operating device provided separately from the agricultural machine during automatic driving of the agricultural machine, such a situation occurs where an operation state of the operating device of the agricultural machine does not correspond to an operation state of the operating device of the remote operating device or does not correspond to an actual operation state of the working device. As a result, the working device does not operate as intended by a user operating any of the operating devices. This may confuse the user.

Example embodiments of the present invention prevent a user from being confused when operating a working device.

Example embodiments of the present invention may include the following features.

An agricultural work assistance system according to an example embodiment of the present invention includes a coupler to couple a working device to an agricultural machine, a controller configured or programmed to control automatic traveling or steering of the agricultural machine to enable the working device to perform agricultural work on an agricultural field, a first operating device that is provided in or on the agricultural machine and is operable to cause the working device to work, a second operating device that is operable outside the agricultural machine to cause the working device to work, and a first detector to detect whether or not a user is on the agricultural machine, in which, while the first detector is detecting the user on the agricultural machine, the working device is capable of working in accordance with operation of the first operating device and operation of the second operating device is disabled, and while the first detector is detecting no user on the agricultural machine, the working device is capable of working in accordance with operation of the second operating device and operation of the first operating device is disabled.

An agricultural machine according to an example embodiment of the present invention includes a traveling body that is capable of traveling, a coupler to couple a working device to the traveling body, a controller configured or programmed to control automatic traveling or steering of the agricultural machine to enable the working device to perform agricultural work on an agricultural field, a first operating device that is operable to cause the working device to work, and a first detector to detect whether or not a user is on the traveling body, in which while the first detector is detecting the user on the traveling body, the controller is configured or programmed to cause the working device to work in accordance with operation of the first operating device and disable operation of a second operating device to cause the working device to work outside the agricultural machine, and while the first detector is detecting no user on the traveling body, the controller is configured or programmed to cause the working device to work in accordance with operation of the second operating device and disable operation of the first operating device.

The agricultural work assistance system may be configured such that the first operating device and the second operating device are operable to change a posture of the working device, and depending on a detection result of the first detector, the controller is configured or programmed to change the posture of the working device in accordance with operation of one of the first operating device and the second operating device and not change the posture of the working device in accordance with operation of the other one of the first operating device and the second operating device during automatic driving in which the agricultural work is performed by the working device while the agricultural machine is traveling.

The agricultural work assistance system may further include a communicator to wirelessly communicate with a terminal, the communicator being provided in or on the agricultural machine, in which the second operating device is provided in or on the terminal, the coupler is operable to change a posture of the working device, while the first detector is detecting no user on the agricultural machine, the terminal is operable to transmit an operation signal according to operation of the second operating device, and the controller is configured or programmed to cause the communicator to receive the operation signal and cause the coupler to change the posture of the working device on a basis of the operation signal, and while the first detector is detecting the user on the agricultural machine, the terminal does not transmit an operation signal according to operation of the second operating device even in a case where the second operating device is operated or the controller does not receive the operation signal.

The agricultural work assistance system may further include a communicator to wirelessly communicate with a terminal, the communicator being provided in or on the agricultural machine, in which the second operating device is provided in or on the terminal, in a case where the first detector detects transition from a state where no user is on the agricultural machine to a state where a user is on the agricultural machine, the controller is configured or programmed to cause the communicator to transmit a disable notification indicating that operation of the second operating device is disabled, and the terminal is operable to make the second operating device inoperable upon receipt of the disable notification.

The agricultural work assistance system may further include a second detector to detect an actual posture of the working device, in which while the first detector is detecting no user on the agricultural machine, the terminal is operable to calculate, upon operation of the second operating device, an input value of the posture of the working device according to the operation and transmit an operation signal including the input value, and when the operation signal is received by the communicator, the controller is configured or programmed to change the posture of the working device so that the input value included in the operation signal and the actual posture of the working device detected by the second detector correspond to each other.

The agricultural work assistance system may be configured to further include a second detector to detect an actual posture of the working device, and a third detector to detect an operation position of the first operating device, in which while the first detector is detecting a user on the agricultural machine, the controller is configured or programmed to calculate, upon operation of the first operating device, a setting value of the posture of the working device according to the operation position of the first operating device detected by the third detector, and change the posture of the working device so that the setting value and the actual posture of the working device detected by the second detector correspond to each other.

The agricultural work assistance system may be configured such that while the first detector is detecting no user on the agricultural machine, the terminal is operable to calculate, upon operation of the second operating device, an input value of the posture of the working device according to the operation and cause the input value to be stored in a storage, and in a case where the first detector detects transition from the state where the user is on the agricultural machine to the state where no user is on the agricultural machine, the controller is configured or programmed to calculate the setting value of the posture of the working device according to the operation position of the first operating device detected by the third detector and cause the communicator to transmit the setting value, and the terminal is operable to change, upon receipt of the setting value of the posture of the working device, the input value of the posture of the working device stored in the storage so that the input value corresponds to the setting value.

The agricultural work assistance system may further include a notifier to output a warning, in which in a case where the first detector detects a transition from the state where no user is on the agricultural machine to the state where a user is on the agricultural machine, the controller is configured or programmed to calculate the setting value of the posture of the working device according to the operation position of the first operating device detected by the third detector, and in a case where the setting value and the actual posture of the working device detected by the second detector do not correspond to each other, cause the notifier to output a warning and change the posture of the working device so that the setting value and the actual raised/lowered height correspond to each other.

The agricultural work assistance system may be configured such that in a case where the first detector detects transition from the state where no user is on the agricultural machine to the state where the user is on the agricultural machine, the controller is configured or programmed to calculate the setting value of the posture of the working device according to the operation position of the first operating device detected by the third detector and does not perform automatic driving of the agricultural machine in a case where the setting value and the actual posture of the working device detected by the second detector do not correspond to each other.

The agricultural work assistance system may be configured such that the controller is configured or programmed to cause the communicator to transmit the actual posture of the working device detected by the second detector; and the terminal includes a display to receive the actual posture of the working device and display the actual posture and an input value of the posture of the working device according to operation of the second operating device.

The agricultural work assistance system may be configured such that the coupler is operable to change a raised/lowered height as the posture of the working device by raising or lowering the working device, the first operating device is an operating device that is operable by a user on the agricultural machine to change the raised/lowered height of the working device and hold an operation position according to the operation, and the second operating device is an operating key that is provided in or on a terminal carried by the user and is operable to change the raised/lowered height of the working device.

The agricultural machine may be configured such that the first operating device is operable by a user on the agricultural machine to change a posture of the working device and hold an operation position according to the operation, and the second operating device is provided in or on a terminal carried by the user and is operable to change the posture of the working device, and depending on a detection result of the first detector, the controller is configured or programmed to change the posture of the working device in accordance with operation of one of the first operating device and the second operating device and not change the posture of the working device in accordance with operation of the other one of the first operating device and the second operating device during automatic driving in which the agricultural work is performed by the working device while the traveling body is traveling.

The agricultural machine may further include a communicator to wirelessly communicate with the terminal, and a second detector to detect an actual posture of the working device, in which the coupler is operable to change the posture of the working device, and while the first detector is detecting no user on the traveling body, the controller is configured or programmed to cause the coupler to, when an operation signal transmitted from the terminal in accordance with operation of the second operating device is received by the communicator, change the posture of the working device so that an input value of the posture of the working device according to the operation of the second operating device included in the operation signal and the actual posture of the working device detected by the second detector correspond to each other.

The agricultural machine may further include a third detector to detect an operation position of the first operating device, and a notifier to output a warning, in which in a case where the first detector detects transition from the state where no user is on the traveling body to the state where a user is on the traveling body, the controller is configured or programmed to calculate a setting value of the posture of the working device according to the operation position of the first operating device detected by the third detector, and in a case where the setting value and the actual posture of the working device detected by the second detector do not correspond to each other, cause the notifier to output a warning and cause the coupler to change the posture of the working device so that the setting value and the actual raised/lowered height correspond to each other.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
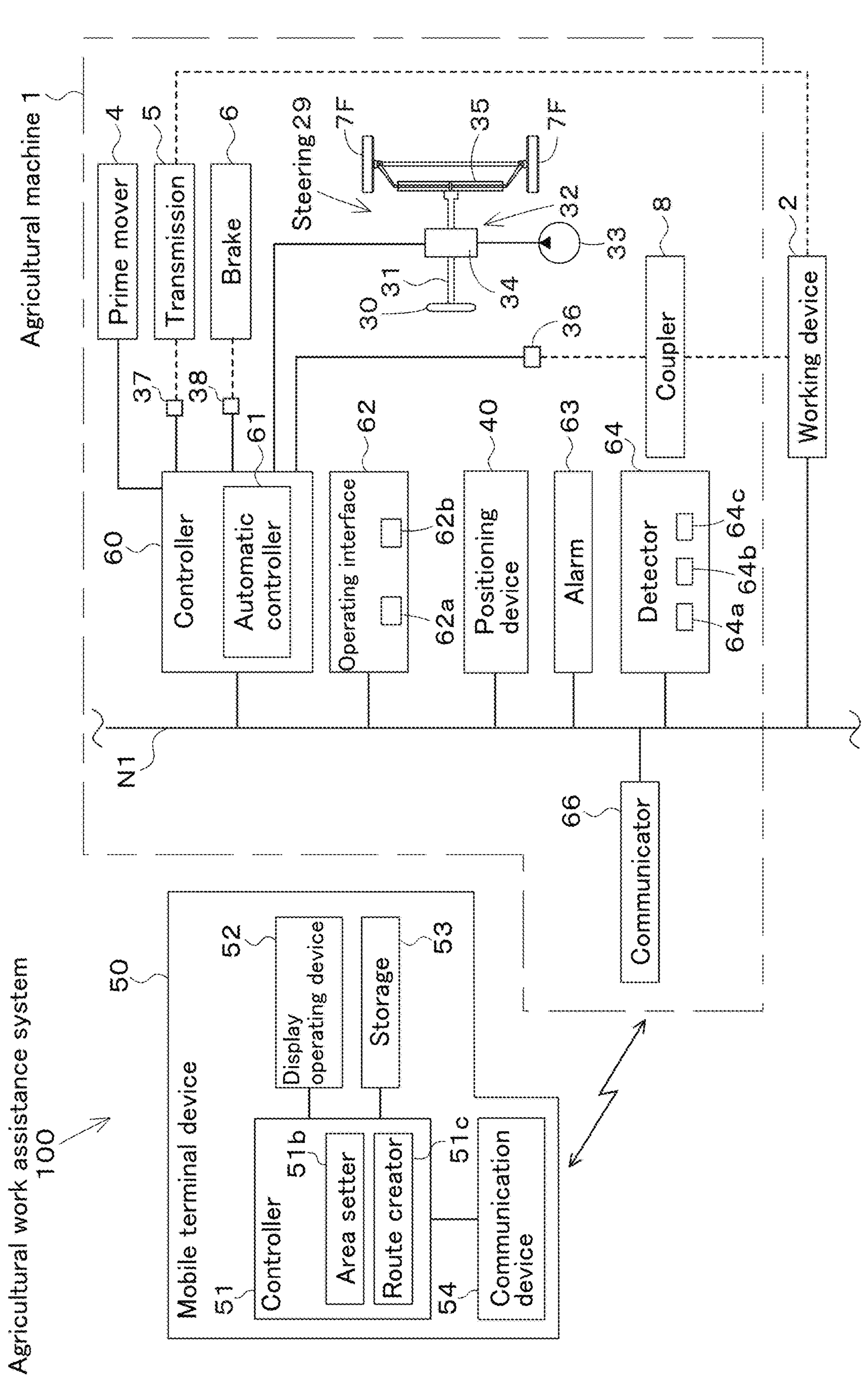
FIG. 1 is a configuration diagram of an agricultural work assistance system.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 11:
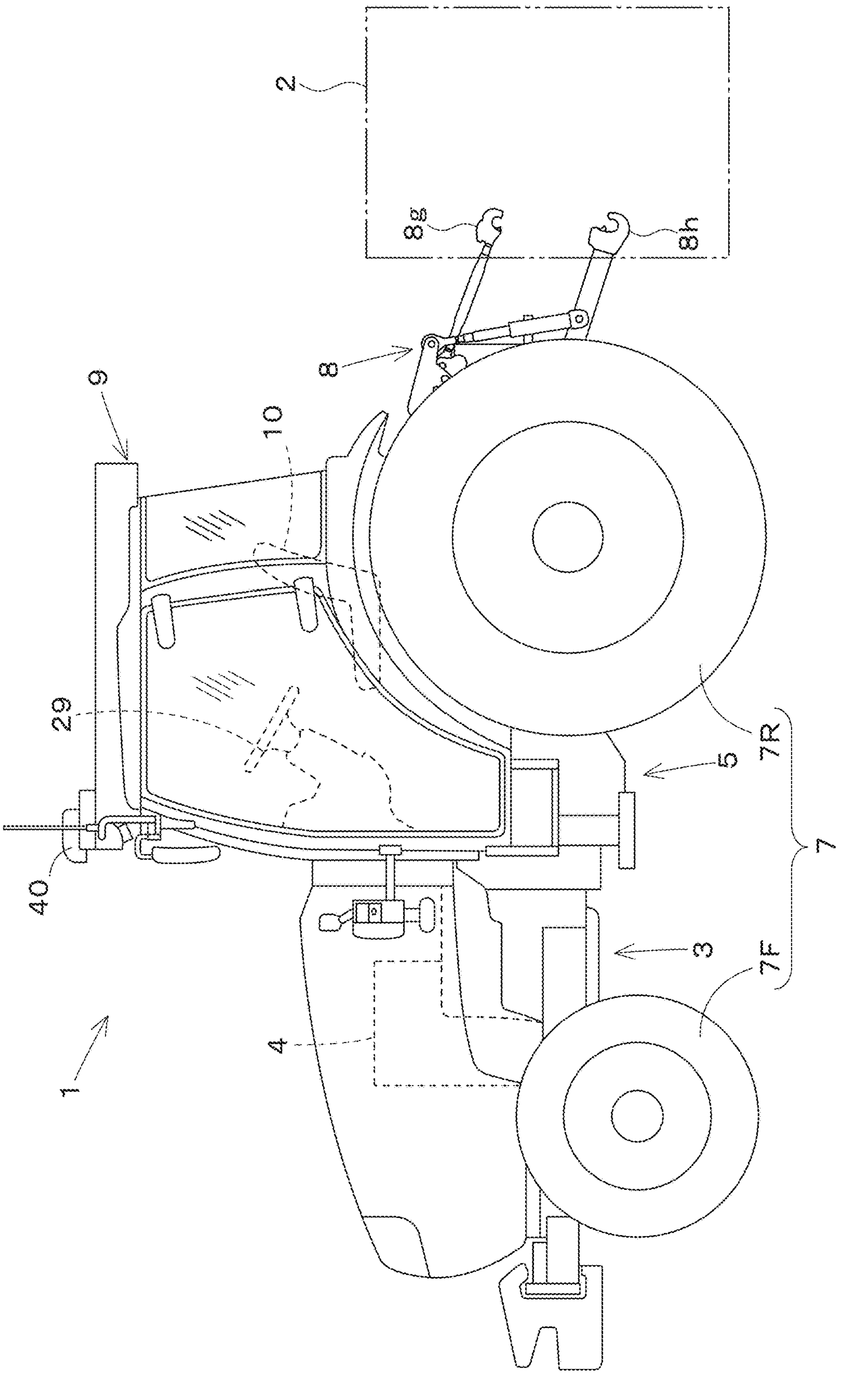
FIG. 11 is a side view of the agricultural machine.

First, an agricultural machine 1 of the present example embodiment is described. FIG. 11 is a side view of an example of the agricultural machine 1. In this example, the agricultural machine 1 is a tractor. Note that the agricultural machine 1 is not limited to a tractor and may be another agricultural machine such as a rice planter or a combine or may be a working vehicle other than a tractor that performs agricultural work.

The agricultural machine 1 includes a traveling body 3, a prime mover 4, a transmission 5, and a traveling device 7. A front wheel 7F of the traveling device 7 may be a tire type or may be a crawler type. Similarly, a rear wheel 7R of the traveling device 7 may be a tire type or may be a crawler type. The prime mover 4 is a diesel engine, an electric motor, or the like. In the present example embodiment, the prime mover 4 is a diesel engine. The transmission 5 can switch a propulsion force of the traveling device 7 by changing speed stages and can switch forward traveling and rearward traveling of the traveling device 7. A driving force of the prime mover 4 is transmitted to the traveling device 7 by the transmission 5 and drives the traveling device 7, and thereby the traveling body 3 travels forward or rearward. Note that the leftward direction of FIG. 11 is a forward direction for the traveling body 3, and the rightward direction of FIG. 11 is a rearward direction for the traveling body 3. The direction toward a deep side of FIG. 11 is a rightward direction for the traveling body 3, and the direction toward the near side of FIG. 11 is a leftward direction for the traveling body 3.

The traveling body 3 is provided with a cabin 9. An operator's seat 10 is provided in or on the cabin 9. A coupler 8 that is a three-point linkage or the like is provided on a rear portion of the traveling body 3. The coupler 8 couples a working device 2 to perform agricultural work to the traveling body 3 of the agricultural machine 1. Specifically, by coupling the working device 2 to coupling units 8*g* and 8*h* provided in or on the coupler 8, the working device 2 and the traveling body 3 are coupled, and thereby the working device 2 can be towed by the agricultural machine 1.

The working device 2 performs ground work on an agricultural field. In this example, examples of the working device 2 include a cultivator (rotary cultivator) that performs cultivating work on the agricultural field, a stubble cultivator that performs stubble cultivation, a puddling device (drive harrow) that performs puddling, a spreader that spreads a fertilizer, an agricultural chemical, or the like, a seeding device that sows seeds, a transplanter that transplants seedlings, and a harvester for harvesting.

Next, an agricultural work assistance system 100 according to the present example embodiment is described. FIG. 1 is a configuration diagram of the agricultural work assistance system 100. The agricultural work assistance system 100 includes the agricultural machine 1, the working device 2, and a mobile terminal 50 (hereinafter simply referred to as a "mobile terminal 50"). The agricultural work assistance system 100 and the mobile terminal 50 assist the agricultural machine 1 in performing agricultural work by the working device 2 while traveling in an agricultural field.

The agricultural machine 1 includes a controller 60, an operating interface 62, the prime mover 4, the transmission 5, a brake 6, a steering 29, the coupler 8, a positioning device 40, an alarm 63, a detector 64, and a communicator 66. An in-vehicle network N1 such as a LAN or a CAN is included in the agricultural machine 1. The controller 60, the operating interface 62, the positioning device 40, the alarm 63, the detector 64, and the communicator 66 are connected to the in-vehicle network N1. Each of these units of the agricultural machine 1 is included in the agricultural work assistance system 100. The communicator 66 includes a communication circuit that wirelessly communicates with the mobile terminal 50.

The controller 60 includes an electric circuit including a CPU (or a microcomputer) and a memory. The memory of the controller 60 includes a volatile memory and a nonvolatile memory. The controller 60 is configured or programmed to control operation of each unit of the agricultural machine 1. The operating interface 62 includes a switch, a lever, a pedal, and other keys that can be operated by a user (operator) such as a driver sitting on the operator's seat 10 or a worker present close to the agricultural machine 1.

The operating interface 62 includes a mode switch 62*a* and a raising/lowering operating lever 62*b*. The mode switch 62*a* is an operating device operable to switch a mode of the agricultural machine 1. The raising/lowering operating lever 62*b* is operable by a user to change a raised/lowered height as a posture of the working device 2, and holds an operation position according to the operation. The raising/lowering operating lever 62*b* is an example of a first operating device.

Modes of the agricultural machine 1 that are selectable by the mode switch 62*a* include an automatic traveling work mode and an automatic steering work mode. The automatic traveling work mode is a mode in which agricultural work (ground work) is performed by the working device 2 while traveling body 3 of the agricultural machine 1 automatically travels. The automatic traveling of the agricultural machine 1 is to automatically change a traveling speed of the traveling body 3 and automatically steer the traveling body 3. The automatic steering work mode is a mode in which agricultural work (ground work) is performed by the working device 2 while automatically steering the traveling body 3. In a case where the agricultural machine 1 is in the automatic steering work mode, the traveling speed of the traveling body 3 is changed in response to driver's operation of an accelerator or a brake included in the operating interface 62. That is, in the automatic steering work mode, the traveling speed of the traveling body 3 is changed on the basis of manual operation.

The agricultural machine 1 can also travel on the basis of manual driving, and ground work can be performed by the working device 2 during the traveling. The manual driving of the agricultural machine 1 means that the driver changes the traveling speed of the traveling body 3 by operating the accelerator or the brake of the operating interface 62 and steers the traveling body 3 by operating a steering wheel 30.

Driving, stoppage, and a rotational speed of the prime mover 4 (engine) are controlled by the controller 60. The transmission 5 is connected to a control valve 37. The control valve 37 is a solenoid valve that operates on the basis of a control signal transmitted from the controller 60. A hydraulic fluid delivered from a hydraulic pump 33 is supplied to the control valve 37. Although the control valve 37 is illustrated as a single block in FIG. 1, an appropriate number of control valves 37 are provided corresponding to the number of hydraulic devices such as a hydraulic clutch or a hydraulic cylinder provided in or on the transmission 5.

The brake 6 is connected to a control valve 38. The control valve 38 is a solenoid valve that operates on the basis of a control signal transmitted from the controller 60. A hydraulic fluid delivered from the hydraulic pump 33 is supplied to the control valve 38. The controller 60 causes the brake 6 to operate by electrically controlling a switching position and an opening of the control valve 38 and thereby brakes the traveling body 3.

The controller 60 controls driving of the transmission 5 by electrically controlling a switching position (opening) of the control valve 37. The transmission 5 transmits a driving force of the prime mover 4 to the traveling device 7, and thereby the traveling device 7 operates. As a result, the traveling body 3 travels forward or rearward. For example, in a case where the working device 2 performs ground work, the transmission 5 transmits the driving force of the prime mover 4 to the working device 2. This increases an operating force of the working device 2.

The controller 60 communicates with the working device 2 over the in-vehicle network N1. Specifically, the working device 2 includes a control unit and a communication unit (not illustrated). The controller 60 transmits a work command to the working device 2 over the in-vehicle network N1. When the work command is received by the communication unit, the control unit of the working device 2 controls operation of each unit of the working device 2 on the basis of the work command to perform agricultural work (ground work). Furthermore, the control unit of the working device 2 causes the communication unit to transmit information or data indicative of a work state or the like to the controller 60 over the in-vehicle network N1. The controller 60 detects the work state or the like of the working device 2 on the basis of the information or data received from the working device 2 over the in-vehicle network N1.

Note that the working device 2 does not include a control unit or a communication unit in some cases. In a case where this kind of working device 2 is used, the controller 60 does not communicate with the working device 2 over the in-vehicle network N1, but controls operation of the working device 2 and detects a work state or the like of the working device 2 by raising or lowering the working device 2 by the coupler 8 as described later and thereby changing a position of the working device 2.

The steering 29 includes the steering wheel 30, a steering shaft (rotary shaft) 31, and an assist mechanism (power steering mechanism) 32. The steering wheel 30 is provided in or on the cabin 9 (FIG. 11). The steering shaft 31 rotates in accordance with rotation of the steering wheel 30. The assist mechanism 32 assists steering using the steering wheel 30.

The assist mechanism 32 includes a control valve 34 and a steering cylinder 35. The control valve 34 is a solenoid valve that operates on the basis of a control signal transmitted from the controller 60. Specifically, the control valve 34 is a three-position switching valve that can be switched by movement of a spool or the like. To the control valve 34, a hydraulic fluid delivered from the hydraulic pump 33 is supplied. The controller 60 adjusts a hydraulic pressure supplied to the steering cylinder 35 by electrically controlling a switching position and an opening of the control valve 34 and thereby extends and contracts the steering cylinder 35. The steering cylinder 35 is connected to knuckle arms 39 that change a direction of the front wheel 7F.

The control valve 34 can also be switched by steering of the steering shaft 31. Specifically, by operating the steering wheel 30, the steering shaft 31 is rotated in accordance with a state of the operation, and thus the switching position and the opening of the control valve 34 are switched. The steering cylinder 35 extends or contracts leftward or rightward of the traveling body 3 in accordance with the switching position and the opening of the control valve 34. By this extending or contracting action of the steering cylinder 35, a steering direction of the front wheel 7F is changed. Note that the steering 29 described above is an example and is not limited to the above configuration.

The traveling body 3 of the agricultural machine 1 can be steered manually by manual operation of the steering wheel 30 and can be steered automatically by the controller 60. The transmission 5 or the brake 6 is driven in accordance with manual operation of the accelerator or the brake (none of which is illustrated) included in the operating interface 62, and thereby the traveling body 3 can travel and stop. Furthermore, the traveling body 3 can automatically travel and stop in accordance with control of the transmission 5 and the brake 6 by the controller 60. That is, the agricultural machine 1 can perform manual driving in which a user (driver) performs traveling operation and steering operation, automatic driving in which the controller 60 automatically performs traveling and steering, and auto steering control (also referred to as automatic steering control or semi-automatic driving) in which the controller 60 automatically performs steering and the user performs traveling operation.

Figure 2:
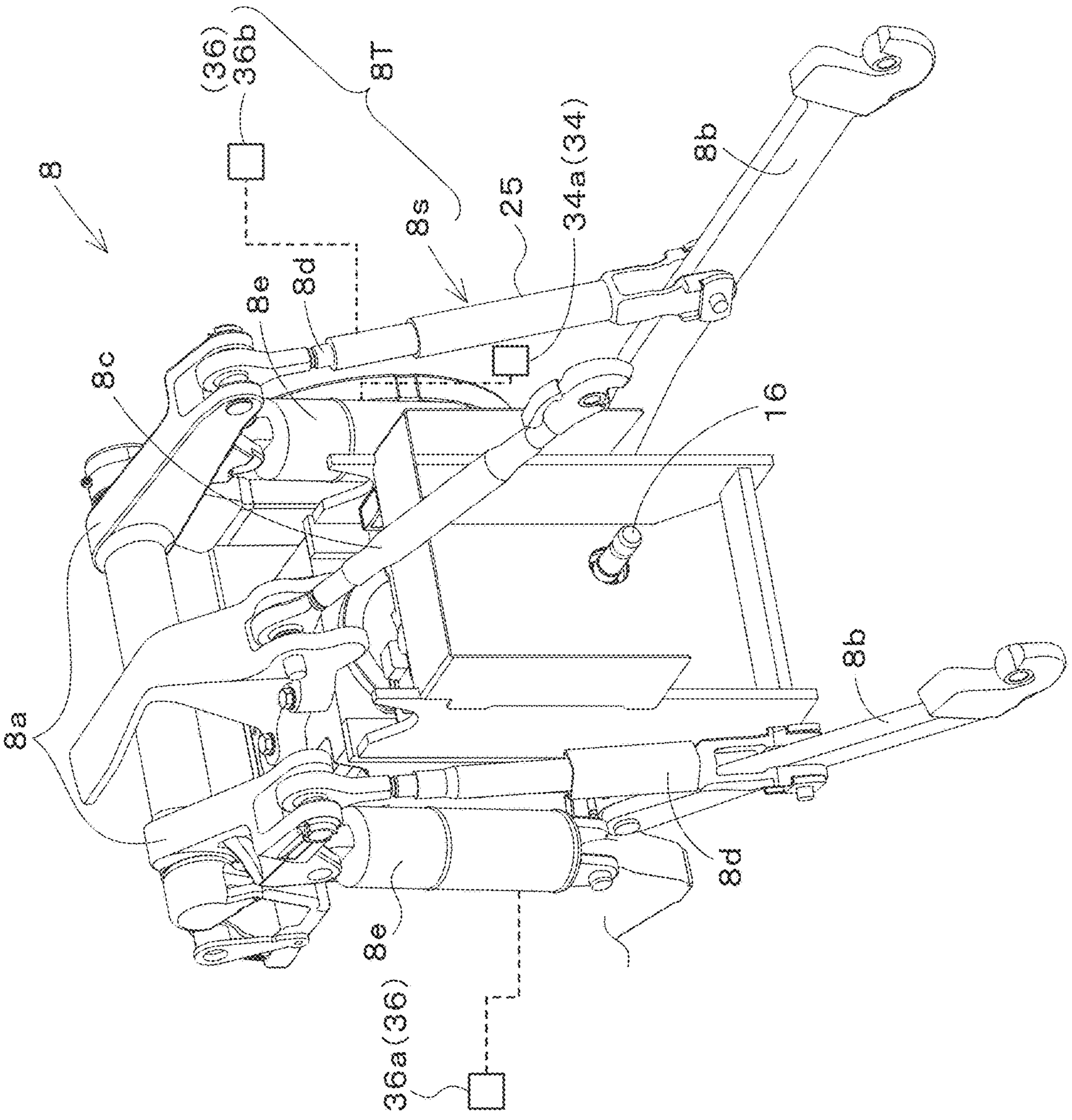
FIG. 2 is a perspective view of a coupler.

FIG. 2 is a perspective view of the raising/lowering device 8. The raising/lowering device 8 includes a lift arm 8*a*, a lower link 8*b*, a top link 8*c*, a lift rod 8*d*, and a lift cylinder 8*e*. A front end portion of the lift arm 8*a* is supported on an upper rear portion of a case (transmission case) in which the transmission 5 is contained so as to be swingable up or down. The lift arm 8*a* is swung (raised and lowered) by driving of the lift cylinder 8*e*. The lift cylinder 8*e* is a hydraulic cylinder. The lift cylinder 8*e* is connected to a control valve 36 (FIG. 1). The control valve 36 is a solenoid valve that operates on the basis of a control signal transmitted from the controller 60. A hydraulic fluid delivered from the hydraulic pump 33 is supplied to the control valve 36.

A front end portion of the lower link 8*b* illustrated in FIG. 2 is supported on a lower rear portion of the transmission 5 (FIGS. 1 and 11) so as to be swingable up or down. A front end portion of the top link 8*c* is supported on a rear portion of the transmission 5 above the lower link 8*b* so as to be swingable up or down. The lift rod 8*d* couples the lift arm 8*a* and the lower link 8*b*. The coupling units 8*g* and 8*h* that can couple the working device 2 are provided at rear end portions of the lower link 8*b* and the top link 8*c*.

The control valve 34 illustrated in FIG. 1 includes a control valve 34*a* and a control valve 34*b* illustrated in FIG. 2. The controller 60 (FIG. 1) adjusts a hydraulic pressure supplied to the lift cylinder 8*e* by electrically controlling a switching position and an opening of the control valve 34 and thereby extends or contracts the lift cylinder 8*e*. When the lift cylinder 8*e* extends or contracts, the lift arm 8*a* rises or lowers, and the lower link 8*b* coupled to the lift arm 8*a* with the lift rod 8*d* interposed therebetween rises or lowers. As a result, the working device 2 swings up or down (rises or lowers) about a front portion (opposite to the coupling units 8*g* and 8*h*) of the lower link 8*b*.

Figure 10A:
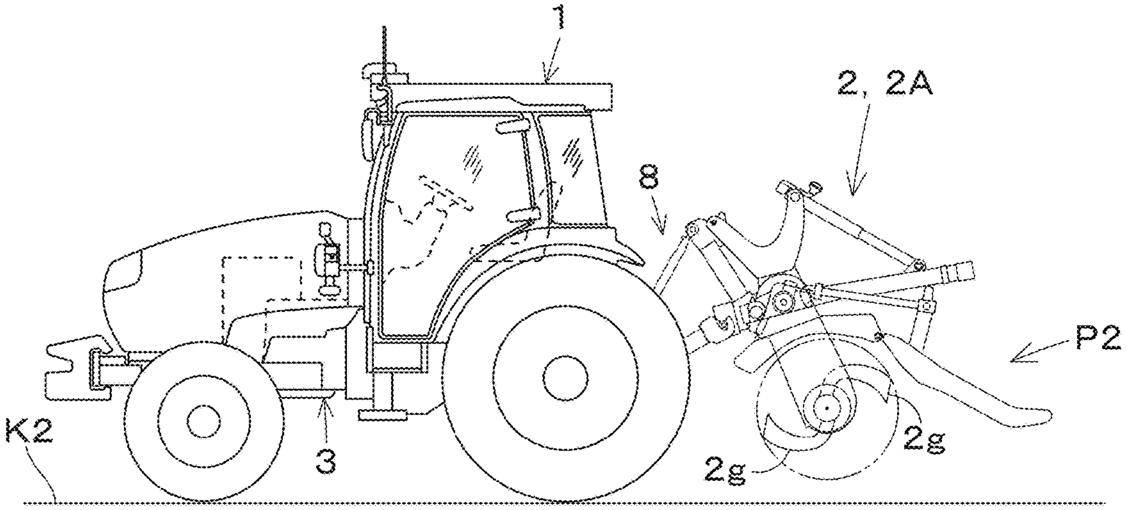
FIG. 10A illustrates an example of a raised/lowered height of a cultivator coupled to the agricultural machine.
Figure 10B:
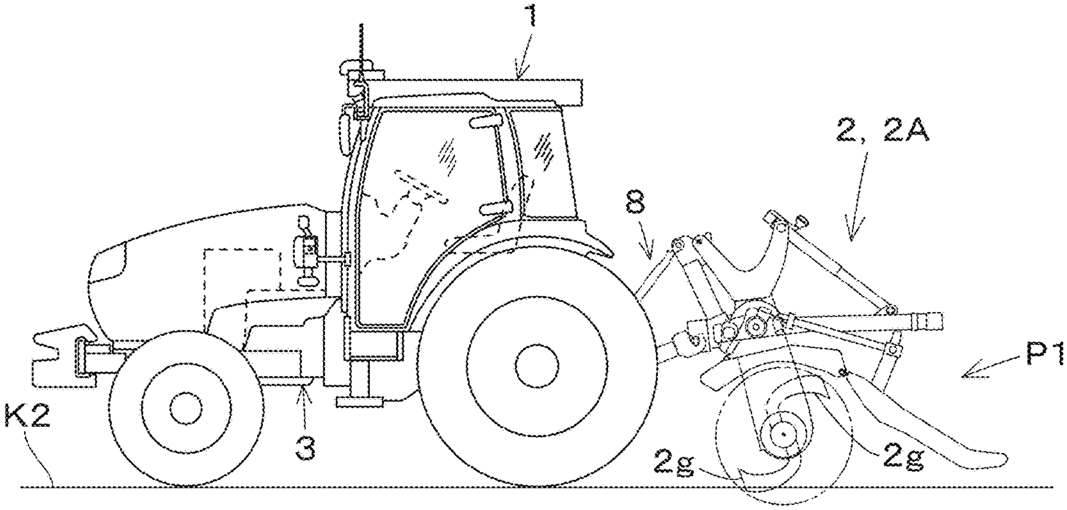
FIG. 10B illustrates an example of a raised/lowered height of a cultivator coupled to the agricultural machine.

In a case where the working device 2 coupled to the agricultural machine 1 is a cultivator 2A as illustrated in FIGS. 10A and 10B, the controller 60 brings a tilling blade 2*g* of the cultivator 2A into contact with soil K2 of the agricultural field by lowering the cultivator 2A by the coupler 8 so that the cultivator 2A is located at a work position P1 where cultivation work can be performed, as illustrated in FIG. 10B. Furthermore, the controller 60 deepens a cultivation depth in the agricultural field by further lowering the cultivator 2A by the coupler 8 or by putting the tilling blade 2*g* deeper into the soil K2 by the cultivator 2A. Furthermore, the controller 60 makes the cultivation depth in the agricultural field shallower by raising the cultivator 2A or the tilling blade 2*g* by the coupler 8 or the cultivator 2A. Furthermore, for example, during transport of the cultivator 2A, the controller 60 causes the cultivator 2A to be located at a non-work position P2 where cultivation work cannot be performed by raising the cultivator 2A by the coupler 8 and thus separating the tilling blade 2*g* apart from the soil K2 of the agricultural field, as illustrated in FIG. 10A. That is, the controller 60 changes the raised/lowered height of the working device 2 by the coupler 8 or the working device 2.

Similarly, in a case where the working device 2 is a working device other than the cultivator 2A, the controller 60 changes the raised/lowered height of the working device 2 by the coupler 8 or the working device 2 in accordance with contents of agricultural work to be performed. That is, the working device 2 whose raised/lowered height is changed by the coupler 8 is not limited to the cultivator 2A, and examples thereof include various kinds of working devices such as a puddling device, a stubble cultivator, and a spreader.

As illustrated in FIG. 2, the coupler 8 includes an angle changer 8T. The angle changer 8T changes a posture of the working device 2 attached to the traveling body 3. The angle changer 8T includes a changing cylinder 8*s*, which is a hydraulic cylinder, and a control valve 36*b*. The changing cylinder 8*s* is connected to a hydraulic pump with the control valve 36*b* interposed therebetween. The control valve 36*b* is a solenoid valve or the like and extends and contracts the changing cylinder 8*s*. The changing cylinder 8*s* couples the lift arm 8*a* and the lower link 8*b* on the right of the traveling body 3.

The controller 60 (FIG. 1) extends and contracts the changing cylinder 8*s* by electrically controlling a switching position or opening of the control valve 36*b* and thereby adjusting a hydraulic pressure supplied to the changing cylinder 8*s* and changes an angle of the working device 2 in the width direction (an angle of a straight line connecting the lower links 8*b* and 8*b* with respect to a horizontal plane) by making angles of the left and right lower links 8*b* different. That is, the controller 60 causes the angle changer 8T to change the angle of the working device 2 in the width direction (left-right direction) (the angle of the straight line connecting the lower links 8*b* and 8*b* with respect to the horizontal plane, which is also called a Monroe angle). For example, the controller 60 causes the angle changer 8T to change the angle of the working device 2 in the width direction to horizontal, parallel with ground, or a predetermined inclination.

The operating interface 62 includes an operating device (a switch or a dial) that is operable to change the angle of the working device 2 in the width direction by the angle changer 8T (not illustrated). The operating interface 62 may include an operating device (a switch or a dial) that adjusts a cultivation depth of the working device 2 (the cultivator 2A) (an amount by which the tilling blade 2*g* is put into the soil K2) separately from the raising/lowering operating lever 62*b*. As described above, the coupler 8 changes a posture (e.g., the raised/lowered height, the Monroe angle, or the cultivation depth) of the working device 2.

The controller 60 causes the working device 2 to perform agricultural work on the agricultural field while automatically performing traveling or steering of the agricultural machine 1 by controlling the prime mover 4, the transmission 5, the brake 6, the traveling device 7, the steering 29, and the coupler 8. Specifically, the controller 60 performs automatic driving in which the agricultural work is performed by the working device 2 while the agricultural machine 1 is automatically traveling. Furthermore, the controller 60 performs automatic steering (auto steering) in which agricultural work is performed on the agricultural field by the working device 2 while automatically steering the agricultural machine 1 and leaving change of the traveling speed of the agricultural machine 1 to manual operation.

The positioning device 40 illustrated in FIG. 1 includes a receiver and an inertial measurement unit (IMU) (not illustrated). The receiver receives a satellite signal (a position of a positioning satellite, a transmission time, correction information, and the like) transmitted from a satellite positioning system (positioning satellite) such as D-GPS, GPS, GLONASS, BeiDou, Galileo, or Michibiki. The positioning device 40 detects a current position (e.g., latitude and longitude) on the basis of the satellite signal received by the receiver. That is, the positioning device 40 is a position detector that detects a position of the traveling body 3 of the agricultural machine 1. The inertial measurement unit includes an acceleration sensor, a gyroscope sensor, and the like. The inertial measurement unit detects a roll angle, a pitch angle, a yaw angle, and the like of the traveling body 3. The alarm 63 includes a buzzer, a speaker, a warning light, or the like provided in or on the traveling body 3. The alarm 63 issues an alarm and a warning to surroundings of the traveling body 3 by sound or light.

The detector 64 includes a seat switch 64*a*, a raised/lowered height detector 64*b*, and a raising/lowering operation detector 64*c*. The seat switch 64*a* is built in a seating portion of the operator's seat 10. While the user (e.g., driver) is sitting on the seating portion of the operator's seat 10, the seat switch 64*a* is ON, and an ON signal is output from the seat switch 64*a* to the controller 60. While the user is not sitting on the seating portion of the operator's seat 10, the seat switch 64*a* is OFF, an OFF signal is output from the seat switch 64*a* to the controller 60. Upon receipt of the ON signal from the seat switch 64*a*, the controller 60 determines that a user is on the agricultural machine 1 (a state where a user is on the agricultural machine 1). Upon receipt of the OFF signal from the seat switch 64*a*, the controller 60 determines that no user is on the agricultural machine 1 (a state where no user is on the agricultural machine 1). The seat switch 64*a* is an example of a first detector.

Note that the first detector is not limited to the seat switch 64*a*. In another example, the controller 60 may detect the state in which a user is on the agricultural machine 1 and the state in which no user is on the agricultural machine 1 from an image taken by a camera that images an inside of the cabin 9. Alternatively, another sensor such as an optical sensor, an infrared sensor, a biological sensor (e.g., a pulse sensor), or a piezoelectric element may be provided in or on the cabin 9, and the controller 60 may detect the state in which a user is on the agricultural machine 1 and the state in which no user is on the agricultural machine 1 on the basis of a signal output from the sensor.

The raised/lowered height detector 64*b* includes, for example, a sensor such as a potentiometer that detects a swing angle of the lower link 8*b* illustrated in FIG. 2. The raised/lowered height detector 64*b* calculates an actual raised/lowered height of the working device 2 from the swing angle of the lower link 8*b* detected by the sensor. The raised/lowered height detector 64*b* is an example of a second detector.

Note that the second detector is not limited to the raised/lowered height detector 64*b*. In another example, a second detector that calculates a swing angle of the lower link 8*b* on the basis of an output signal output from another sensor such as a rotation sensor or an optical sensor or a control signal or an opening of the control valve 36 (FIG. 2) and calculates an actual raised/lowered height of the working device 2 from the swing angle may be used.

The raising/lowering operation detector 64*c* includes, for example, a sensor such as a potentiometer that detects a swing angle of the raising/lowering operating lever 62*b* that can be swung. The raising/lowering operation detector 64*c* calculates an operation position of the raising/lowering operating lever 62*b* from the swing angle of the raising/lowering operating lever 62*b* detected by the sensor. The raising/lowering operation detector 64*c* is an example of a third detector.

Note that the third detector is not limited to the raising/lowering operation detector 64*c*. In another example, a third detector that calculates a swing angle and an operation position of the raising/lowering operating lever 62*b* on the basis of an output signal output from another sensor such as a rotation sensor or an optical sensor may be used. The controller 60 changes the raised/lowered height of the working device 2 by controlling the coupler 8 (or the working device 2) in accordance with operation (operation position) of the raising/lowering operating lever 62*b*.

The detector 64 further includes sensors and cameras installed at portions of the agricultural machine 1 and the working device 2 and an electric circuit that processes output signals output from the sensors and cameras. The detector 64 detects working states (driving and stopped states, a working position, and the like) of the units such as the transmission 5, the brake 6, the traveling device 7, the coupler 8, the steering 29, and the operating interface 62 of the agricultural machine 1 on the basis of output signals from the sensors and the like. Furthermore, the detector 64 detects a working state of the working device 2 on the basis of an output signal from a sensor or the like. Furthermore, the detector 64 includes an object detection sensor such as LiDAR or an ultrasonic sensor. The object detection sensor is installed on a front portion, a rear portion, and left and right side portions of the traveling body 3. The object detection sensor detects presence or absence of an object around the agricultural machine 1, a distance to the object, and the like.

The mobile terminal 50 is, for example, a tablet terminal or a smartphone. The mobile terminal 50 is carried by a user and is moved out of the agricultural machine 1 or is installed at a predetermined position in the cabin 9 of the agricultural machine 1. That is, the mobile terminal 50 is operable both outside the agricultural machine 1 and inside the agricultural machine 1. Note that the outside of the agricultural machine 1 is not limited to an outside of the cabin 9, and means a position, an apparatus, or a device other than the agricultural machine 1. The position, apparatus, or device other than the agricultural machine 1 may be close to the agricultural machine 1 or may be far from the agricultural machine 1.

The mobile terminal 50 includes a controller 51, a display operating device 52, a storage 53, and a communication device 54. The controller 51 includes a CPU (or a microcomputer), a volatile memory, and a nonvolatile memory. The controller 51 is configured or programmed to control each unit of the mobile terminal 50. The controller 51 is configured or programmed to include an area setter 51*b* and a route creator 51*c*. Although the area setter 51*b* and the route creator 51*c* are software programs in this example, the area setter 51*b* and the route creator 51*c* may be hardware such as a semiconductor element such as an ASIC or an electric circuit in another example.

The display operating device 52 is a touch panel and displays various kinds of information on a screen. Furthermore, by performing a predetermined operation on a display screen of the display operating device 52, various inputs can be performed. The display operating device 52 may include a display, an operating device, and an input device. Instead of the display operating device 52, independent display unit and operating device (input device) may be provided in or on the mobile terminal 50. Information indicative of a predetermined warning is output by being displayed on the display operating device 52. Alternatively, sound, voice, or light indicative of a predetermined warning may be output from the alarm 63. The display operating device 52 and the alarm 63 are an example of a notifier.

The storage 53 is a nonvolatile memory or the like. In the storage 53, information or data for assisting traveling of the agricultural machine 1 and agricultural work using the working device 2 are stored in a readable and writable manner. The communication device 54 is an electric circuit or a semiconductor element operable to communicate with the communicator 66 or the controller 60. Specifically, in a case where the mobile terminal 50 is located outside the agricultural machine 1, the communication device 54 and the communicator 66 wirelessly communicate with each other. In a case where the mobile terminal 50 is installed inside the cabin 9 of the agricultural machine 1 (inside the agricultural machine 1) and is electrically connected to the in-vehicle network N1 by a cable or the like, the communication device 54 and the controller 60 can perform wired communication with each other.

When a user performs a predetermined operation on a screen displayed on the display operating device 52 after activation of the mobile terminal 50, information on an agricultural field, the agricultural machine 1, or the working device 2, work conditions on which the agricultural machine 1 and the working device 2 perform agricultural work in the agricultural field, information to perform automatic driving of the agricultural machine 1, or the like is input to the mobile terminal 50. Then, when the user performs predetermined operation on the display operating device 52 to confirm the input contents, the area setter 51*b* sets a predetermined area in a map indicative of the agricultural field. Furthermore, the route creator 51*c* creates a traveling route along which the agricultural machine 1 travels in the map.

Figure 3:
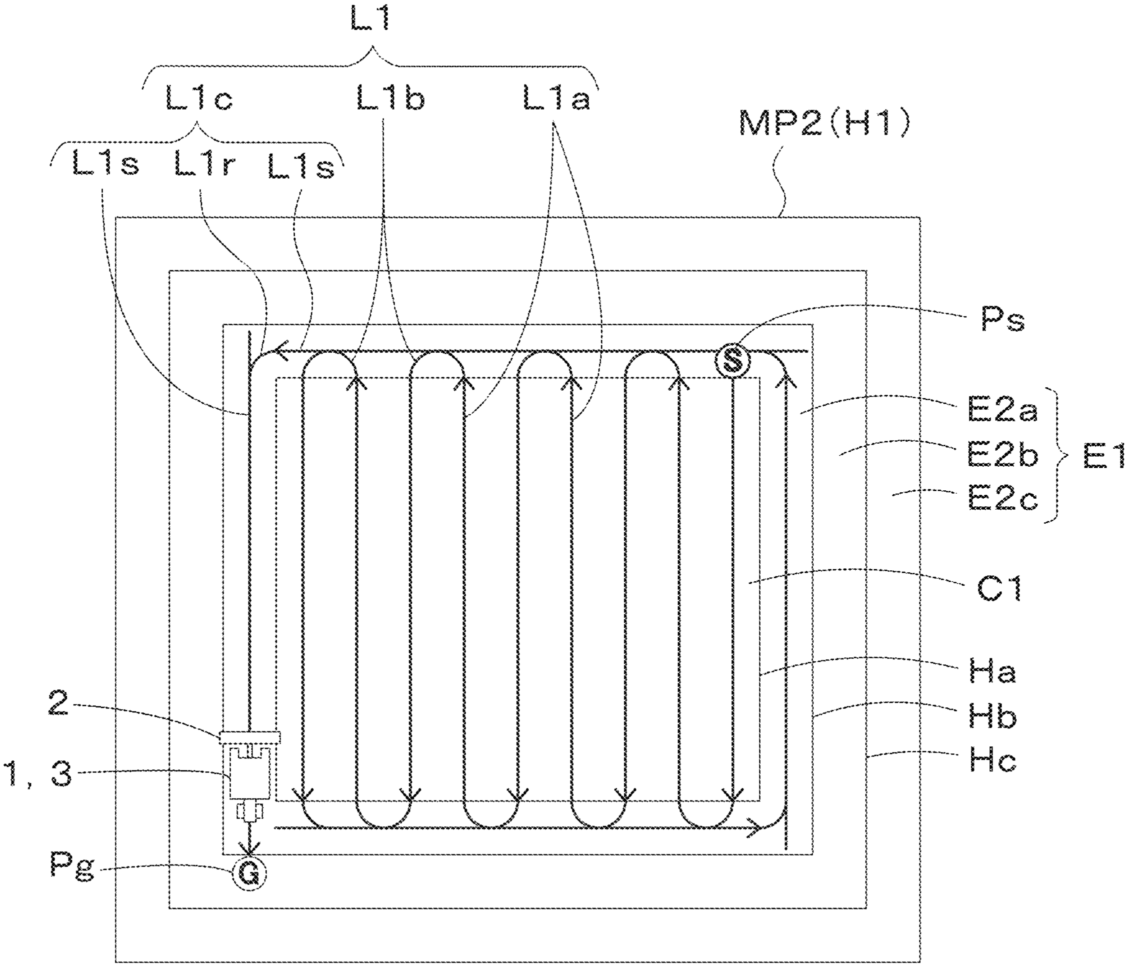
FIG. 3 illustrates an example of a traveling route.

FIG. 3 illustrates an example of the traveling route L1 created by the route creator 51*c*. The area setter 51*b* (FIG. 1) sets a central area C1 and a headland area E1 in an agricultural field map MP2 as illustrated in FIG. 3, for example, on the basis of position information of the agricultural field, dimension information of the working device 2, the work condition, and the like. Specifically, for example, the area setter 51*b* calculates contours Hc, Hb, and Ha formed by offsetting the contour H1 of the agricultural field inward as many times as the number of headlands by a width obtained by subtracting a headland overlapping margin from a work width of the working device 2. Then, the area setter 51*b* sets, as the central area C1, an area (central portion) surrounded by the innermost contour Ha among the contours Hc, Hb, and Ha. Furthermore, the area setter 51*b* sets, as the headland area E1, a frame-shaped area (outer frame portion) outside the central area C1 and inside the contour H1 of the agricultural field. Furthermore, in the headland area E1, the area setter 51*b* sets, as headlands E2*c*, E2*b*, and E2*c*, areas between adjacent contours among the contour H1 of the agricultural field and the contours Hc, Hb, and Ha formed by offsetting the contour H1 of the agricultural field.

The route creator 51*c* (FIG. 1) creates the traveling route L1 in the agricultural field map MP2 on the basis of the position information of the agricultural field, the areas C1 and E1, dimension information of the agricultural machine 1 and the working device 2, the work conditions, automatic driving information, or the like. Specifically, the route creator 51*c* creates a plurality of unit work sections within the central area C1 by dividing the central area C1 by a width obtained by subtracting a central portion overlapping margin included in the work conditions from the work width of the working device 2 starting from one end portion (right end portion in FIG. 3) of the central area C1 parallel to a work direction (the up-down direction in FIG. 3). Then, the route creator 51*c* creates a straight traveling route L1*a* along which the traveling body 3 travels straight on a central line of each unit work section in a width direction (the left-right direction in FIG. 3). Next, the route creator 51*c* creates, in the headland area E1, a turning route L1*b* that connects adjacent straight traveling routes L1*a*. The turning route L1*b* is a route along which the traveling body 3 travels from one of the adjacent two straight traveling routes L1*a* to the other. When creating the turning route L1*b*, the route creator 51*c* secures, in the headland area E1, a turning space where the agricultural machine 1 and the working device 2 turn.

Although a simple semi-circular turning route L1*b* is illustrated in FIG. 3, this shape is merely used for convenience such as easier displaying on the display screen of the display operating device 52 and easier viewing of the traveling route L1 on the display screen. When the traveling body 3 of the agricultural machine 1 and the working device 2 actually turn toward the other straight traveling route L1*a* after traveling on the basis of the one straight traveling route L1*a*, the traveling vehicle 3 and the like sometimes draw a track of a more complicated shape than the semi-circular shape by not only traveling forward, but also traveling backward or turning plural times. That is, the turning route L1*b* is a route for display on the display operating device 52, and the agricultural machine 1 does not necessarily turn on the basis of the turning route L1*b*.

While the traveling body 3 is traveling on the basis of the straight traveling route L1*a*, the controller 60 (FIG. 1) of the agricultural machine 1 causes the coupler 8 (FIG. 2) to lower the working device 2 to the work position P so that ground work is performed by the working device 2. While the traveling body 3 is turning in a portion corresponding to the turning route L1*b*, that is, while the traveling body 3 is turning from the one straight traveling route L1*a* toward the other straight traveling route L1*a*, the controller 60 causes the coupler 8 to raise the working device 2 to the non-work position P2 so that the ground work using the working device 2 is stopped. That is, the straight traveling route L1*a* is a work route along which ground work is performed by the working device 2 while the traveling body 3 of the agricultural machine 1 is automatically traveling. The central area C1 where a plurality of straight traveling routes L1*a* are formed is a work area where ground work is performed by the working device 2 while the traveling body 3 is automatically traveling straight back and forth.

For example, in a case where working in the central area C1 and the innermost headland E2*a* is input as a work condition, the route creator 51*c* creates, in the headland area E1, a circling route L1*c* circling outside the central area C1 in addition to the straight traveling route L1*a* and the turning route L1*b*. The circling route L1*c* is a work route along which ground work is performed by the working device 2 while the traveling body 3 of the agricultural machine 1 is automatically traveling. The circling route L1*c* includes a plurality of straight traveling routes L1*s*, which are substantially linear, and a plurality of turning routes L1*r*, which are curved with a predetermined radius of curvature or more. The plurality of straight traveling routes L1*s* are created on a central line of the headland E2*a* in a width direction so as to correspond to linear portions of the contour Ha of the central area C1.

The turning route L1*r* is a route from one straight traveling route L1*s* toward another straight traveling route L1*s* adjacent to the one straight traveling route L1*s* in an extending direction of the one straight traveling route L1*s*. The one straight traveling route L1*s* and the other straight traveling route L1*s* have different extending directions, but a terminal end of the one straight traveling route L1*s* and a start end of the other straight traveling route L1*s* are connected by the turning route L1*r*. Also when creating the turning route L1*r*, the route creator 51*c* secures, in the headland area E1, a turning space in which the traveling body 3 of the agricultural machine 1 and the working device 2 turn.

In FIG. 3, a simple arc-shaped turning route L1*b* is illustrated for convenience of illustration. The agricultural machine 1 and the like may draw a track having a more complicated shape than the arc shape by not only traveling forward but also traveling rearward or turning plural times when actually turning from the one straight traveling route L1*s* toward the other straight traveling route L1*s*. That is, the turning route L1*r* is a route for display on the display operating device 52, and the agricultural machine 1 does not necessarily turn on the basis of the turning route L1*r*.

After creating the circling route L1*c*, the route creator 51*c* sets a start position Ps at an end portion of one straight traveling route L1*a* that is not connected to the turning route L1*b* (an upper end portion of a right-end straight traveling route L1*a* in FIG. 3) among end portions of the straight traveling routes L1*a* at both ends (left and right ends in FIG. 3) of the central area C1, and connects the circling route L1*c* to an end portion of the other straight traveling route L1*a* (a lower end portion of a left-end straight traveling route L1*a* in FIG. 3). Furthermore, the route creator 51*c* sets a goal position Pg at an end portion of the circling route L1*c* that is not connected to the straight traveling route L1*a*. Then, the route creator 51*c* causes information indicative of the areas C1 and E1, the traveling route L1, the start position Ps, the goal position Pg, and the turning space to be stored as route information in the internal memory.

When creation of the traveling route L1 by the route creator 51*c* is completed, the controller 51 causes route information such as the agricultural field map MP2, the areas C1 and E1, the traveling route L1, the start position Ps, and the goal position Pg, to be displayed on the display operating device 52. Then, when the user performs predetermined operation by the display operating device 52, the controller 51 causes a traveling control screen D8 illustrated in FIG. 4 to be displayed on the display operating device 52. Furthermore, the controller 51 generates automatic traveling data on the basis of setting information stored in the internal memory and causes the communication device 54 to transmit (output) the automatic traveling data to the controller 60 of the agricultural machine 1.

The automatic traveling data includes the route information, setting information of the agricultural machine 1, setting information of the working device 2, and automatic driving information. Information on the traveling route L1 included in the route information includes information indicative of positions of the work routes L1*a* and L1*s*, and does not necessarily include information indicative of positions of the turning routes L1*b* and L1*r*. The setting information of the agricultural machine 1 and the working device 2 includes the dimension information of the agricultural machine 1 and the working device 2 and a kind of agricultural work to be performed.

Figure 4:
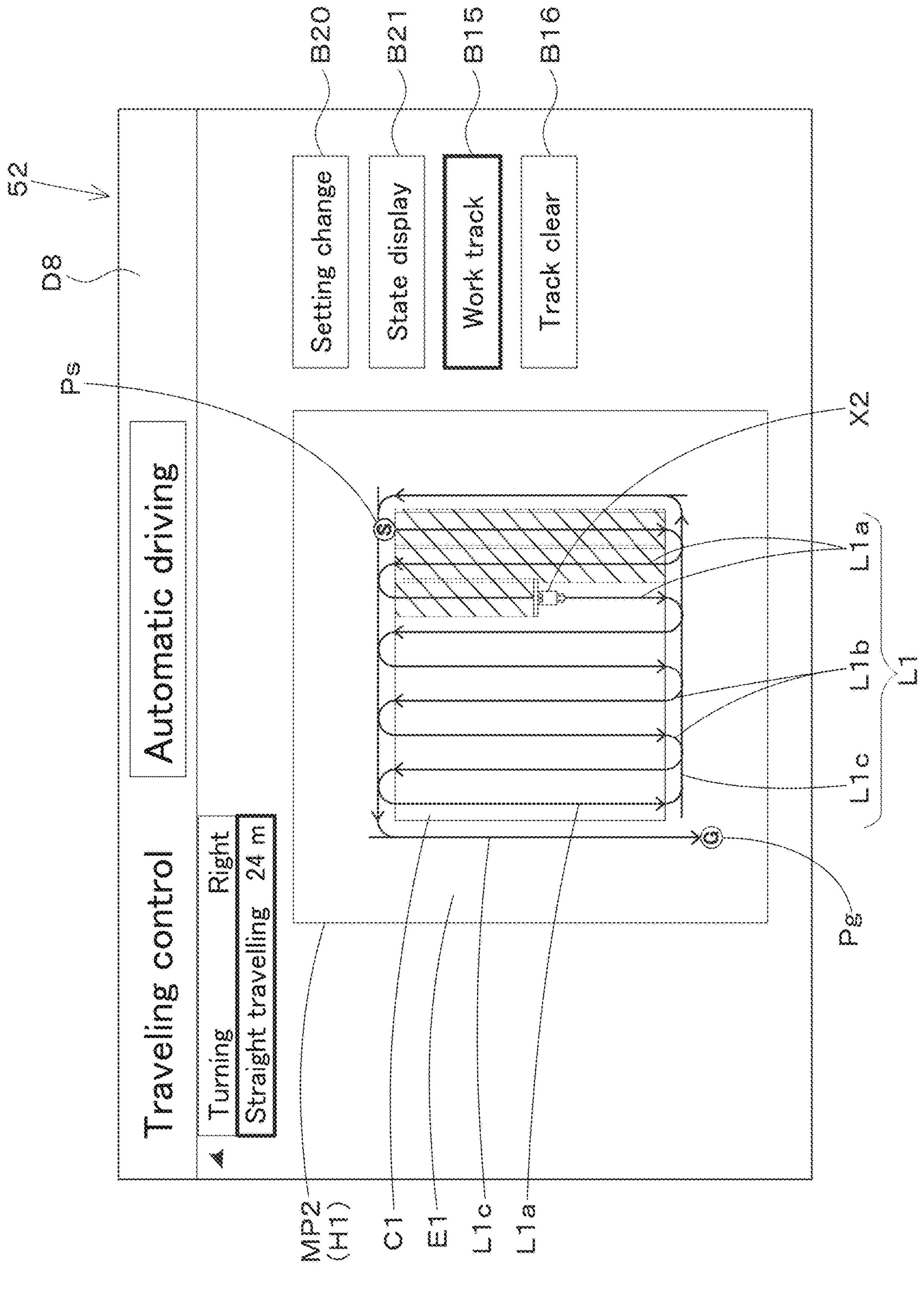
FIG. 4 illustrates an example of a traveling control screen.
Figure 5A:
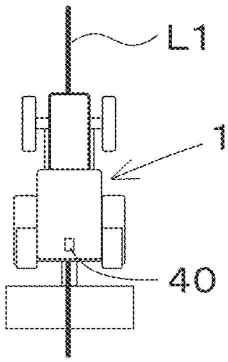
FIG. 5A is a view for explaining automatic driving of an agricultural machine.
Figure 5B:
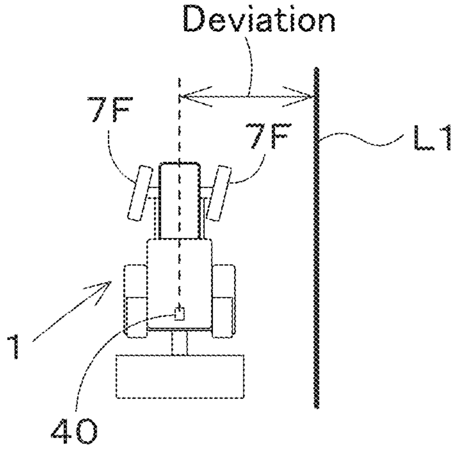
FIG. 5B is a view for explaining automatic driving of the agricultural machine.
Figure 5C:
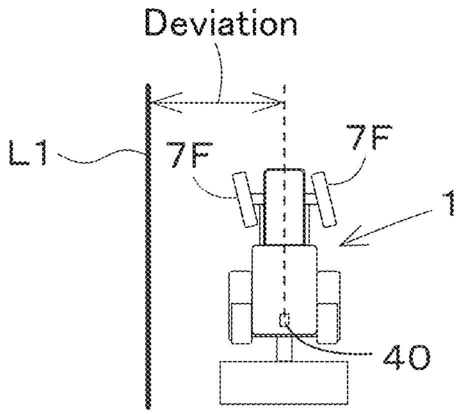
FIG. 5C is a view for explaining automatic driving of the agricultural machine.
Figure 5D:
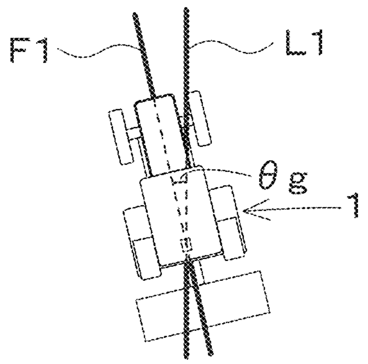
FIG. 5D is a view for explaining automatic driving of the agricultural machine.

The traveling control screen D8 illustrated in FIG. 4 is a screen on which a traveling state of the agricultural machine 1 and a work state of the working device 2 in the automatic traveling work mode are displayed. Note that in FIG. 4, the traveling state and the work state of the agricultural machine 1 some time after start of the automatic traveling work mode are displayed on the traveling control screen D8. On the traveling control screen D8, the agricultural field map MP2, the traveling route L1, the start position Ps, the goal position Pg, an agricultural machine mark X2, the traveling state of the agricultural machine 1, a setting change key B20, a state display key B21, a work track key B15, and a track clear key B16 are displayed. The controller 51 causes the communication device 54 to acquire an actual position of the traveling body 3 detected by the positioning device 40 on a predetermined cycle, and causes the agricultural machine mark X2 to be displayed as needed at a position corresponding to the position of the traveling body 3 on the agricultural field map MP2. That is, the agricultural machine mark X2 on the traveling control screen D8 indicates the actual position of the traveling body 3 of the agricultural machine 1.

For example, the user manually drives the agricultural machine 1 to the start position Ps while viewing the traveling control screen D8 and then performs predetermined operation for shifting to the automatic traveling work mode by the mode switch 62*a* (FIG. 1). As a result, the controller 60 shifts to the automatic traveling work mode, and starts automatic driving of the agricultural machine 1 and causes the working device 2 to perform ground work while causing the traveling body 3 to automatically travel on the basis of the automatic traveling data received from the mobile terminal 50 and the position of the traveling body 3 detected by the positioning device 40.

Specifically, the controller 60 first reads the route information included in the automatic traveling data and grasps the areas C1 and E1, the traveling route L1 (the work routes L1*a* and L1*s*), the start position Ps, and the goal position Pg. Then, the controller 60 causes the working device 2 to perform ground work while causing the traveling body 3 to automatically travel from the start position Ps on the basis of the straight traveling route L1*a* of the traveling route L1. When the traveling body 3 (the agricultural machine 1) reaches a terminal end of one straight traveling route L1*a*, the controller 60 stops the ground work using the working device 2 once, raises the working device 2, and causes the traveling body 3 to turn toward a start end of adjacent another straight traveling route L1*a*. That is, the controller 60 causes the agricultural machine 1 and the working device 2 to turn in a portion corresponding to the turning route L1*b*. In this process, the controller 60 causes the agricultural machine 1 and the working device 2 to turn on the basis of the position information of the areas C1 and E1, position information of the straight traveling route L1*a*, dimension information of the agricultural machine 1 and the working device 2, a position of the traveling body 3 detected by the positioning device 40, a detection result of the detector 64, and the like.

Then, when the traveling body 3 reaches the start end of the other straight traveling route L1*a*, the controller 60 lowers the working device 2, and resumes the ground work using the working device 2 when the traveling body 3 starts to automatically travel on the basis of the other straight traveling route L1*a*. In this way, the traveling body 3 automatically travels straight back and forth in the central area C1, and ground work is performed on the central area C1 by the working device 2.

Then, the controller 60 causes the working device 2 to perform ground work while causing the traveling body 3 to automatically travel on the basis of the circling route L1*c* and the position of the traveling body 3. In this process, the controller 60 causes the working device 2 to perform ground work while causing the traveling body 3 to automatically travel on the basis of the straight traveling route L1*s*, and stops the ground work using the working device 2 by raising the working device 2 while the traveling body 3 is turning in a portion corresponding to the turning route L1*r*. In this turning, the controller 60 causes the agricultural machine 1 and the working device 2 to turn on the basis of the position information of the areas C1 and E1, the position information of the straight traveling route L1*s*, the dimension information of the agricultural machine 1 and the working device 2, the position of the traveling body 3 detected by the positioning device 40, a detection result of the detector 64, and the like. In this way, the traveling body 3 automatically circles outside the central area C1, and the working device 2 performs ground work on the headland E2*a* (FIG. 3) that surrounds the central area C1.

FIGS. 5A to 5D are views for explaining automatic steering of the agricultural machine 1. In the automatic traveling work mode, the controller 60 calculates a deviation between the position of the traveling body 3 detected by the positioning device 40 and the traveling route L1 (the work routes L1*a* and L1*s*) while allowing the traveling body 3 to automatically travel. In a case where the deviation is less than a threshold value (for example, FIG. 5A), the controller 60 maintains a rotation angle of the steering shaft 31 (FIG. 1). In a case where the deviation between the position of the traveling body 3 and the traveling route L1 is equal to or larger than the threshold value and the traveling body 3 is located on the left relative to the traveling route L1 (for example, FIG. 5B), the controller 60 rotates the steering shaft 31 so that the traveling body 3 is steered rightward. In a case where the deviation between the position of the traveling body 3 and the traveling route L1 is equal to or larger than the threshold value and the traveling body 3 is located on the right relative to the traveling route L1 (for example, FIG. 5C), the controller 60 rotates the steering shaft 31 so that the traveling body 3 is steered leftward. The above method is an example of a method for automatic steering of the agricultural machine 1, and the method for automatic steering of the agricultural machine 1 is not limited to the above method.

Furthermore, the controller 60 calculates an actual vehicle speed of the traveling body 3 on the basis of a change in position of the traveling body 3 while the traveling body 3 is automatically traveling on the basis of the traveling route L1. Then, driving of the transmission 5, the brake 6, and the prime mover 4 is controlled so that the actual vehicle speed matches (or substantially matches) a vehicle speed associated with the straight traveling route L1*a*, the turning route L1*b*, or the circling route L1*c*.

As described above, in the automatic traveling work mode of the agricultural machine 1, the controller 60 automatically steers the traveling body 3 while automatically changing the traveling speed of the traveling body 3 on the basis of the traveling route L1 and the position of the traveling body 3 (the agricultural machine 1). Furthermore, the controller 60 automatically performs and stops the agricultural work (ground work) of the working device 2. Furthermore, the controller 60 automatically changes the raised/lowered height of the working device 2 by controlling the coupler 8 or the working device 2 on the basis of the traveling route L1 during automatic driving of the agricultural machine 1. Furthermore, when the user performs predetermined operation by the display operating device 52 during automatic driving of the agricultural machine 1, the controller 60 changes the raised/lowered height of the working device 2 by controlling the coupler 8 or the working device 2 in accordance with the operation.

Figure 6A:
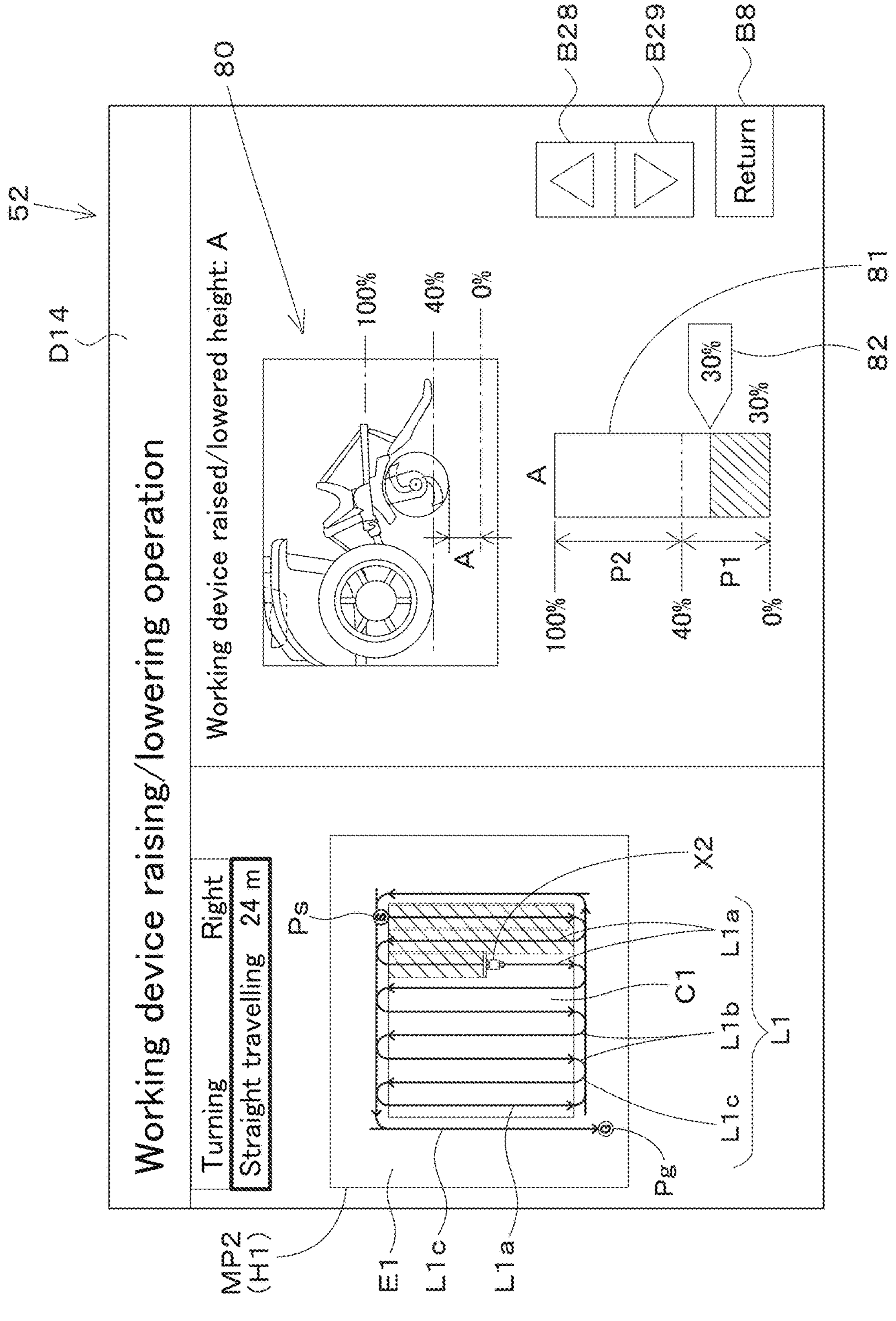
FIG. 6A illustrates an example of a raised/lowered height operation screen.

Specifically, when the user performs predetermined operation on the display operating device 52 after selecting the setting change key B20 on the traveling control screen D8 illustrated in FIG. 4 during automatic driving of the agricultural machine 1, a raising/lowering operation screen D14 illustrated in FIG. 6A is displayed on the display operating device 52. The raising/lowering operation screen D14 is a screen usable to operate the raised/lowered height of the working device 2. The agricultural field map MP2, the traveling route L1, and others are displayed in a left portion of the raising/lowering operation screen D14 as with the traveling control screen D8 (FIG. 4), and a schematic view 80 indicative of the raised/lowered height of the working device 2, a meter 81, a cursor 82, raising/lowering operating keys B28 and B29, and a return key B8 are displayed in a right portion of the raising/lowering operation screen D14.

The schematic view 80 is a view illustrating the raised/lowered height of the working device 2. In this example, the raised/lowered height of the working device 2 is expressed in percentage (%). That is, a lower limit value of the raised/lowered height of the working device 2 that can be changed by the coupler 8 and the like (FIG. 2) is set to 0%, an upper limit value of the raised/lowered height is set to 100%, and the raised/lowered height of the working device 2 is changeable between 0% to 100%. Furthermore, a height identical to a lower end of the rear wheel 7R of the agricultural machine 1 is regarded as ground (a soil surface of the agricultural field), and the height corresponds to 40%, which is illustrated in the schematic view 80. For example, in a case where the working device 2 is the cultivator 2A (FIG. 10B), the tilling blade 2*g* cuts into the soil K2 so that cultivation work can be performed on the soil K2 in a case where the raised/lowered height of the cultivator 2A is less than 40%.

The meter 81 (FIG. 6A) indicates a range (0% to 100%) where the raised/lowered height of the working device 2 is changeable. Furthermore, the meter 81 indicates an actual raised/lowered height of the working device 2 (the hatched portion) and a height of the ground (the horizontal line indicated by the line with alternate long and short dashes;

40%). The controller 51 acquires the actual raised/lowered height of the working device 2 detected by the raised/lowered height detector 64*b* (FIG. 1) through the communication device 54 and the communicator 66 of the agricultural machine 1, and causes the actual raised/lowered height to be stored in the storage 53 and causes the actual raised/lowered height to be displayed on the meter 81.

Figure 6B:
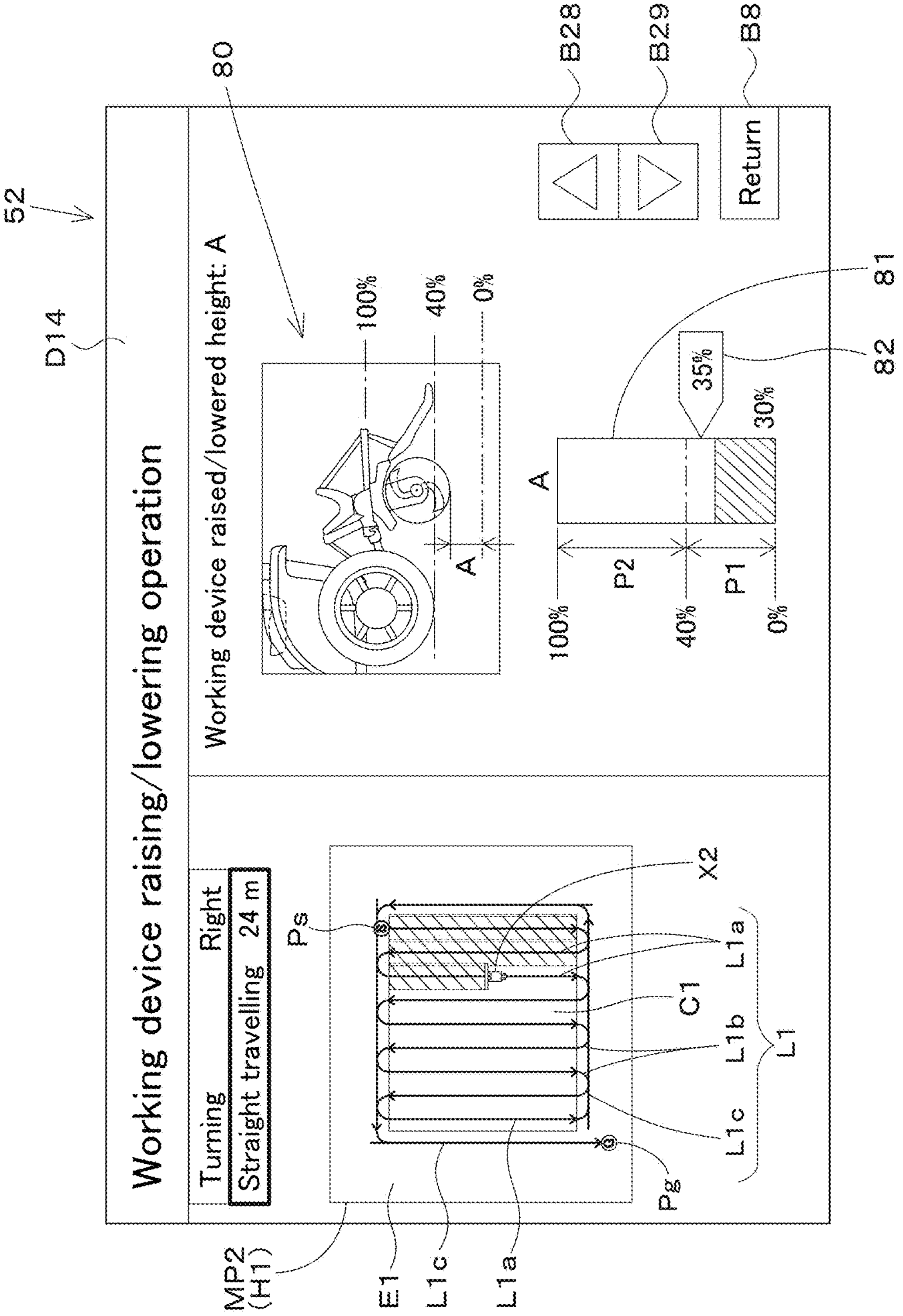
FIG. 6B illustrates an example of the raised/lowered height operation screen.

The raising/lowering operating keys B28 and B29 are operating keys operable to change the raised/lowered height of the working device 2 by raising or lowering the working device 2. When the user operates (temporarily taps or touches for a predetermined period or more) the raising operating key B28, the controller 51 moves the cursor 82 upward within the range (0% to 100%) of the meter 81 as illustrated in FIG. 6B in response to the operation of the raising operating key B28, and calculates a position on the meter 81 indicated by the cursor 82 as an input value of the raised/lowered height of the working device 2.

When the user operates (temporarily taps or touches for a predetermined period or more) the lowering operating key B29, the controller 51 moves the cursor 82 downward within the range (0% to 100%) of the meter 81 (not illustrated) in response to the operation of the raising operating key B28, and calculates a position on the meter 81 indicated by the cursor 82 as an input value of the raised/lowered height of the working device 2. That is, the cursor 82 indicates an input value of the raised/lowered height of the working device 2 that is input by operation of the raising/lowering operating keys B28 and B29. Note that immediately after the raising/lowering operation screen D14 is displayed, an input value (initial input value) of the raised/lowered height of the working device 2 stored in advance in the storage 53 is indicated by the cursor 82.

When the user operates the return key B8 after inputting the input value (changed value) of the raised/lowered height of the working device 2 (for example, the state of FIG. 6B: changing the input value to 35%) by moving the cursor 82 by the raising/lowering operating keys B28 and B29 as described above, the controller 51 determines that the input value has been decided, causes the input value to be stored in the storage 53, and transmits the input value to the controller 60 through the communication device 54 and the communicator 66 of the agricultural machine 1.

In another example, a decision key may be prepared on the raising/lowering operation screen D14. In this case, when the user operates the decision key, the controller 51 determines that an input value of the raised/lowered height of the working device 2 indicated by the cursor 82 has been decided, causes the input value to be stored in the storage 53, and transmits the input value to the controller 60 through the communication device 54 and the communicator 66 of the agricultural machine 1. When the user operates the return key B8, the controller 51 causes the traveling control screen D8 to be displayed on the display operating device 52 instead of the raising/lowering operating screen D14 without deciding (while canceling) the input value of the raised/lowered height of the working device 2 indicated by the cursor 82.

In another example, when the user inputs an input value (changed value) of the raised/lowered height of the working device 2 by moving the cursor 82 by the raising/lowering operating keys B28 and B29, the controller 51 may cause the input value to be stored in the storage 53 and transmit the input value to the controller 60 through the communication device 54 and the communicator 66 of the agricultural machine 1.

When the input value of the raised/lowered height of the working device 2 is received by the communicator 66, the controller 60 changes the raised/lowered height of the working device 2 by controlling the coupler 8 or the like (the coupler 8 or the working device 2) so that the raised/lowered height corresponds to the input value. That is, the controller 60 changes the raised/lowered height of the working device 2 by controlling the coupler 8 or the like in response to operation of the raising/lowering operating keys B28 and B29. Furthermore, the controller 60 causes the communicator 66 to transmit an actual raised/lowered height of the working device 2 detected by the raised/lowered height detector 64*b* to the mobile terminal 50. Furthermore, the controller 60 calculates a setting value of the raised/lowered height of the working device 2 according to an operation position of the raising/lowering operating lever 62*b* detected by the raising/lowering operation detector 64*c*, and causes the communicator 66 to transmit the setting value to the mobile terminal 50.

Figure 6C:
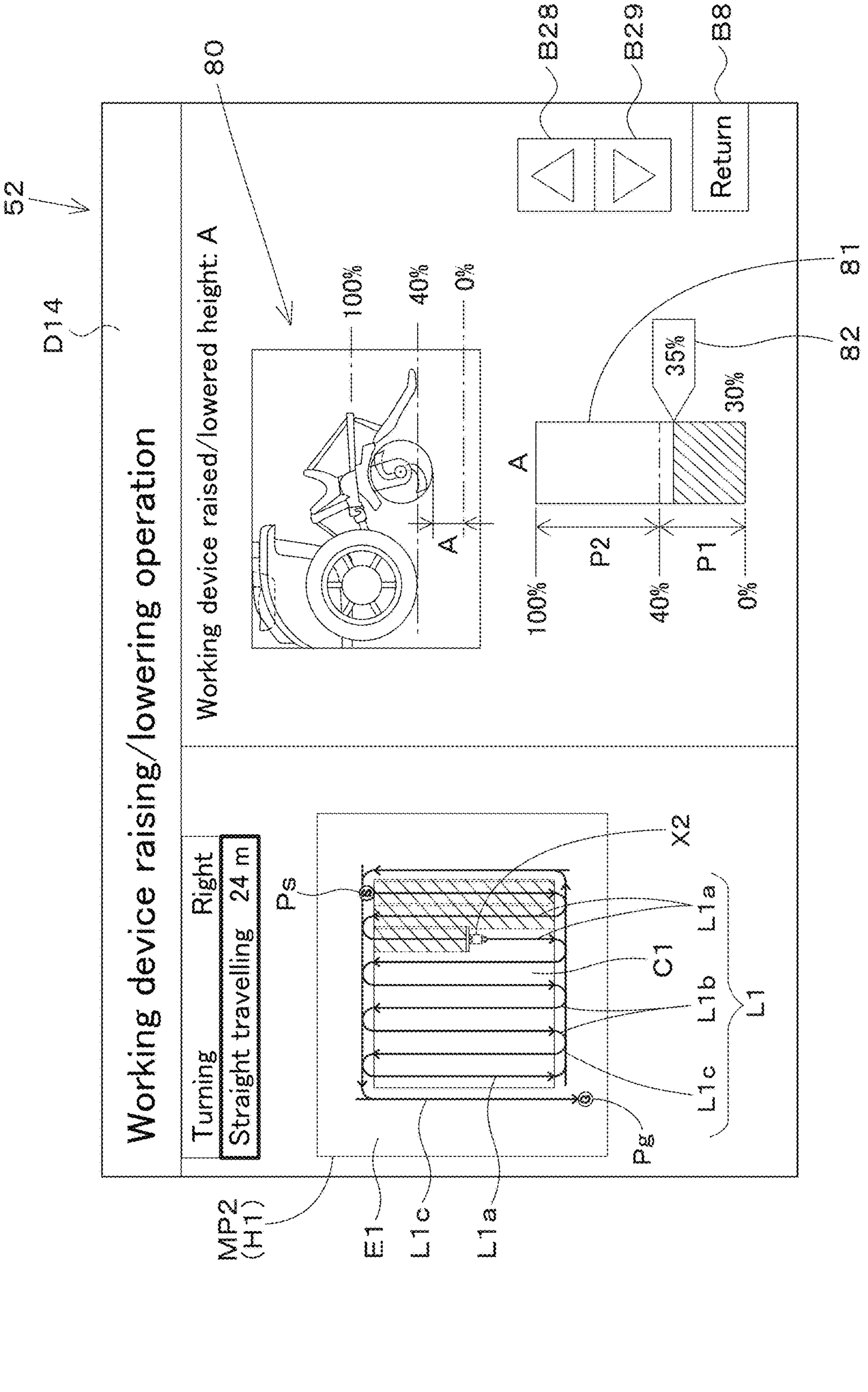
FIG. 6C illustrates an example of the raised/lowered height operation screen.

In the mobile terminal 50, when the actual raised/lowered height of the working device 2 transmitted from the controller 60 is received by the communication device 54, the controller 51 updates the actual raised/lowered height of the working device 2 (the hatched portion) indicated by the meter 81 so that the actual raised/lowered height corresponds to (matches) the input value indicated by the cursor 82 (the actual raised/lowered height indicated by the meter 81 35%=the input value 35%), as illustrated in FIG. 6C. Alternatively, when the setting value of the raised/lowered height of the working device 2 transmitted from the controller 60 is received by the communication device 54, the controller 51 updates the actual raised/lowered height of the working device 2 indicated by the meter 81 so that the actual raised/lowered height corresponds to (matches) the setting value. Furthermore, the controller 51 may cause the display operating device 52 to change (update) a display state of the working device 2 in the schematic view 80 so that the display state corresponds to the actual raised/lowered height of the working device 2.

Figure 7A:
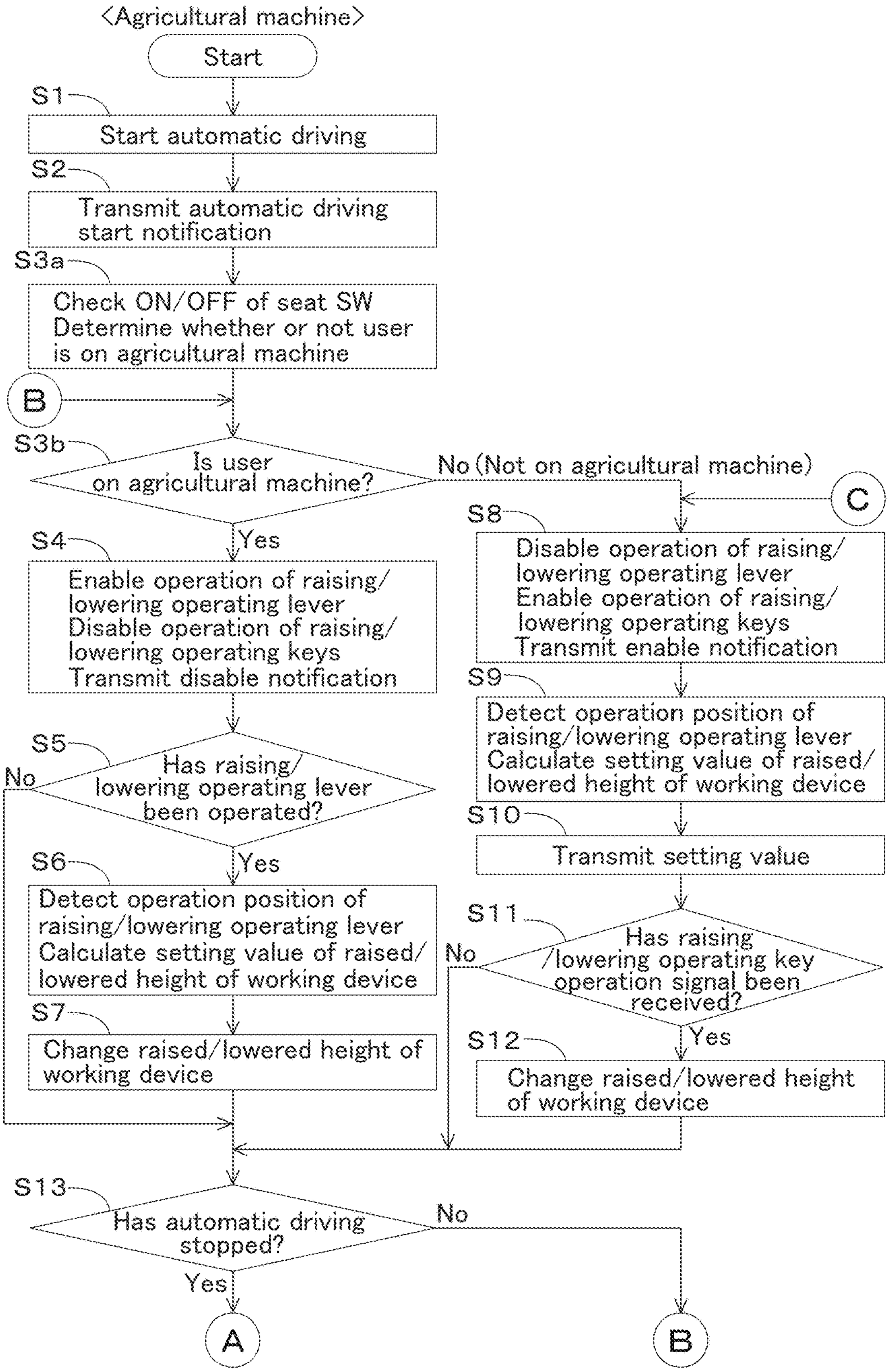
FIG. 7A is a flowchart illustrating an example of operation of the agricultural machine.
Figure 7B:
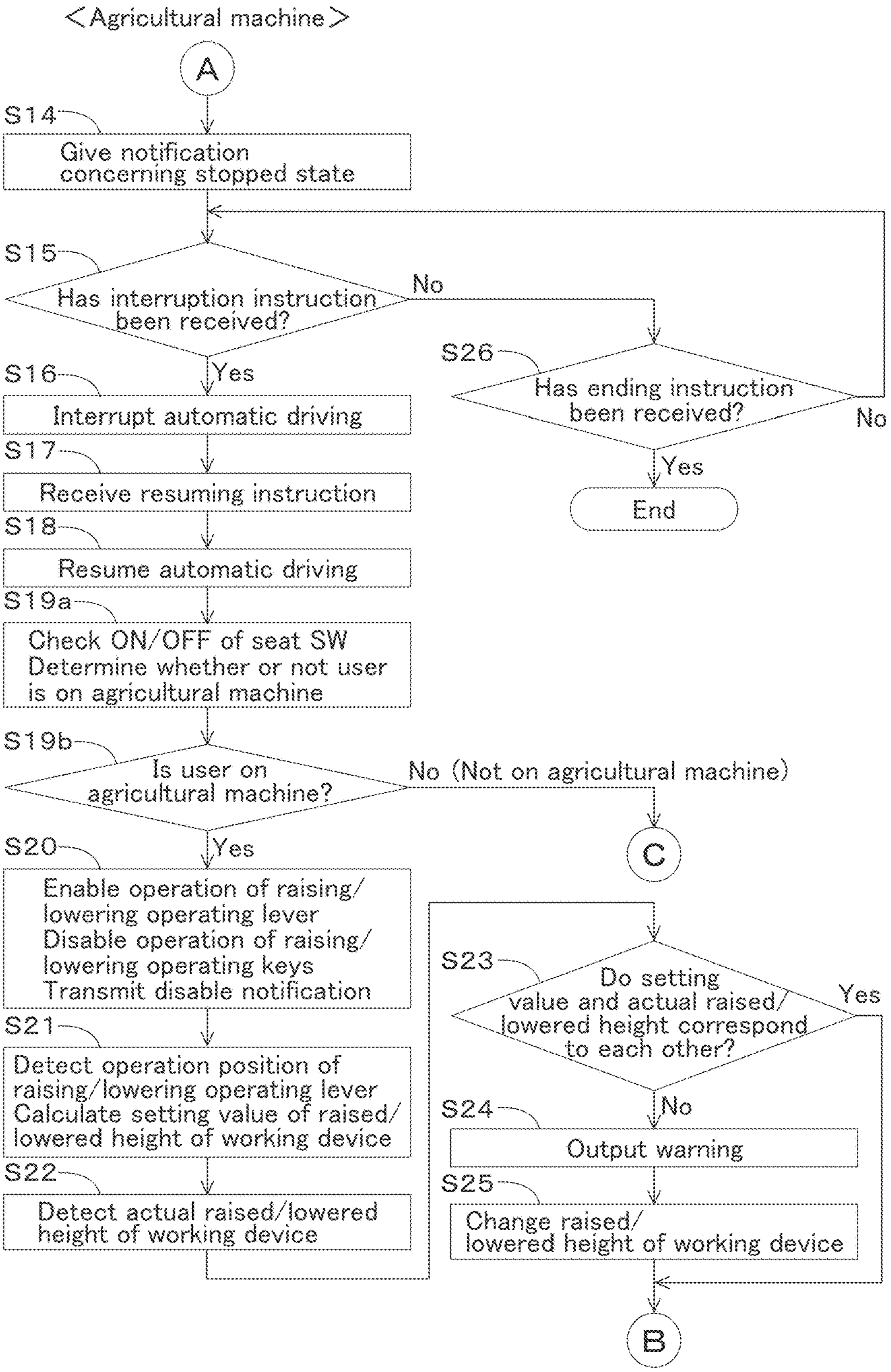
FIG. 7B is a flowchart illustrating a continuation of the operation shown in FIG. 7A.
Figure 8A:
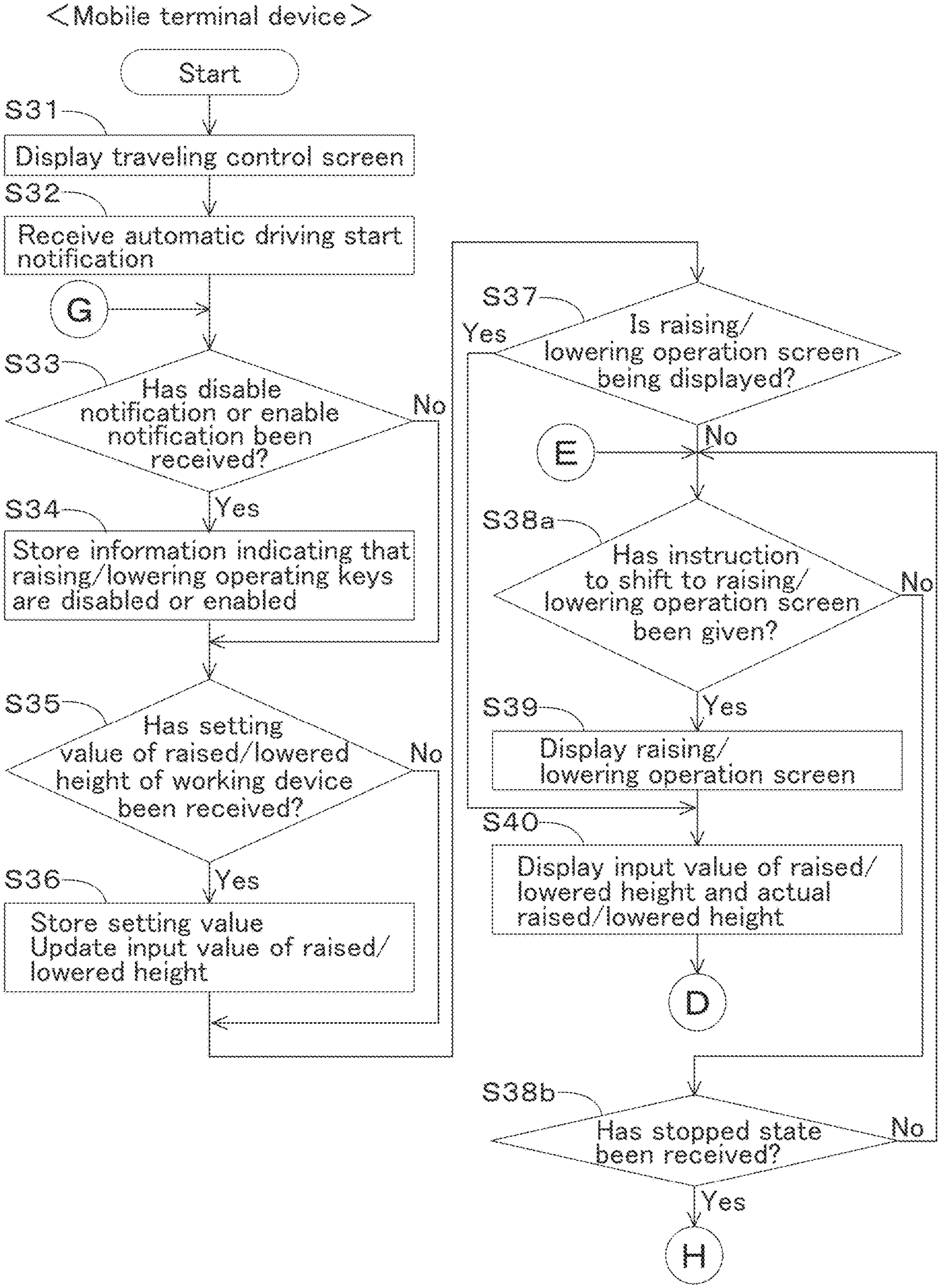
FIG. 8A is a flowchart illustrating an example of operation of a terminal.
Figure 8B:
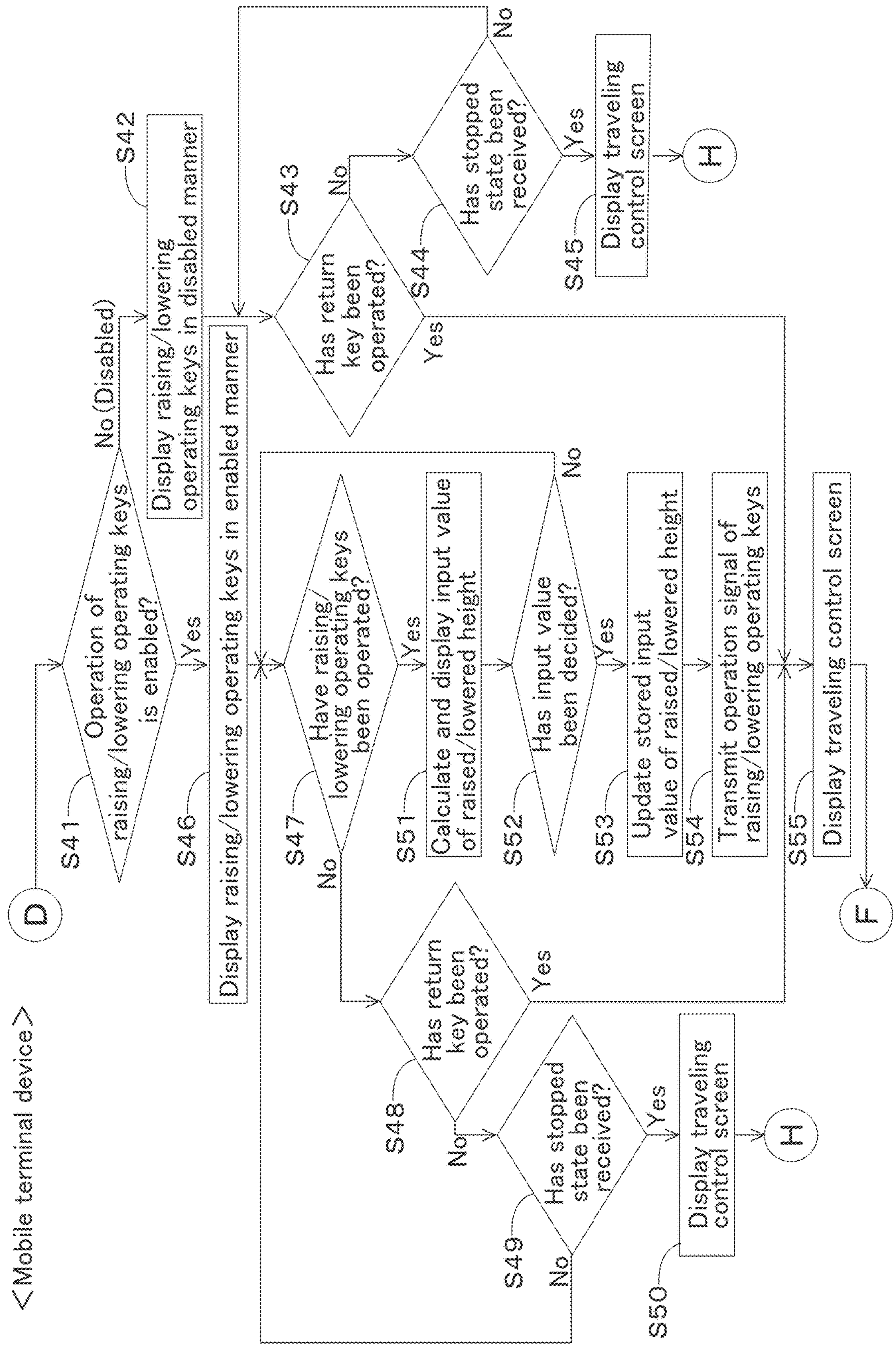
FIG. 8B is a flowchart illustrating a continuation of the operation shown in FIG. 8A.
Figure 8C:
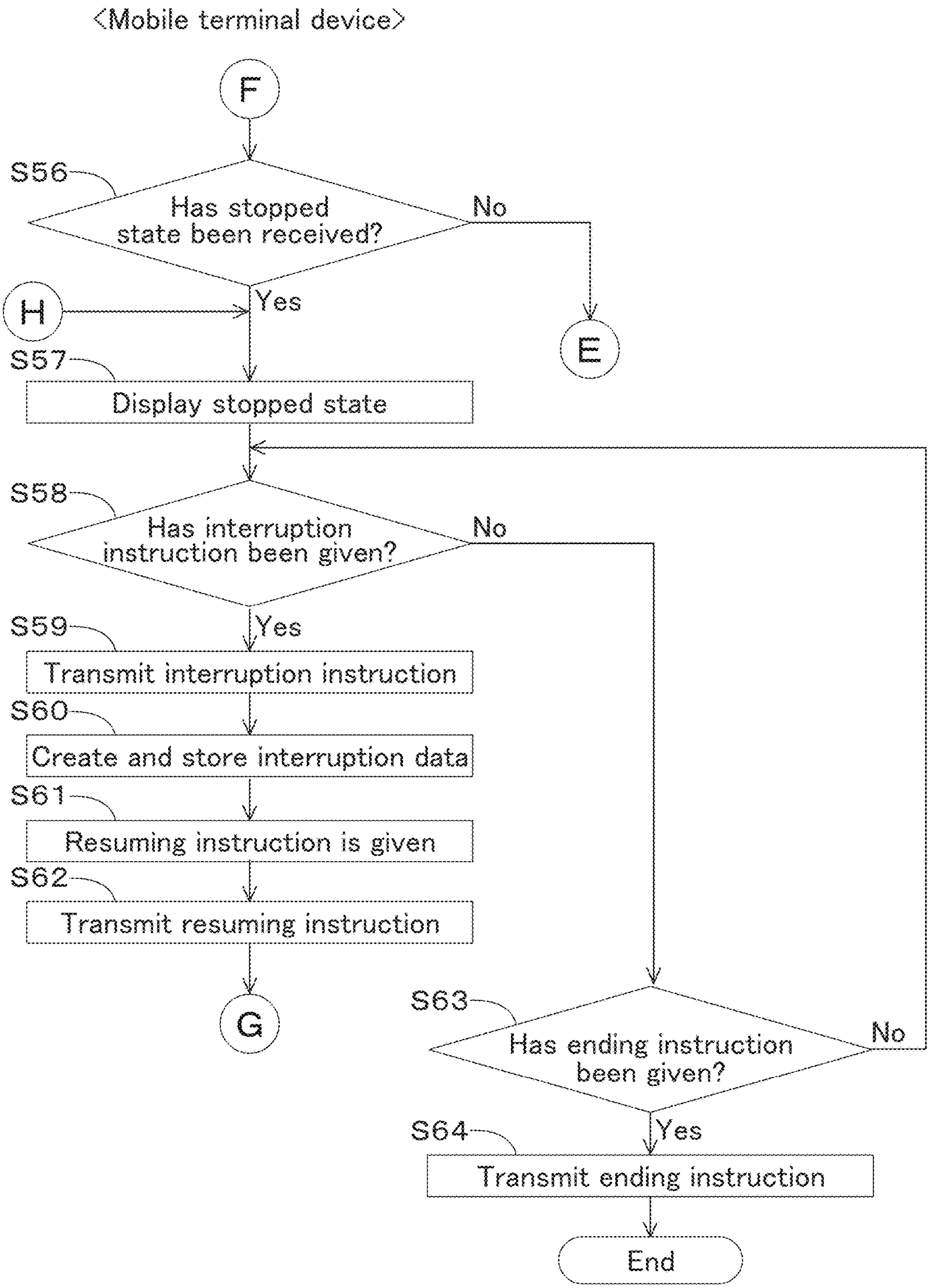
FIG. 8C is a flowchart illustrating a continuation of the operation shown in FIG. 8B.
Figure 9:
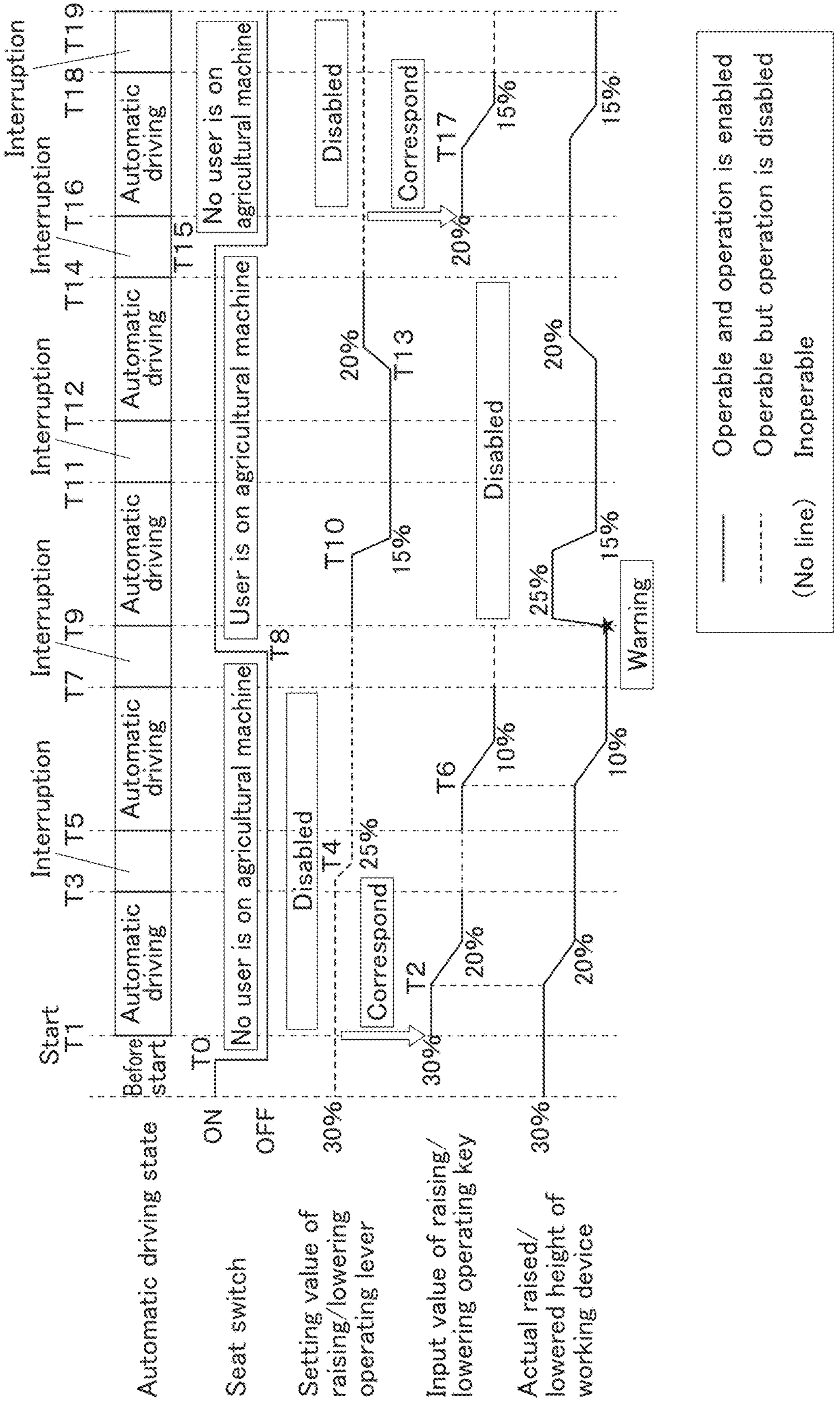
FIG. 9 is a timing chart illustrating an example of a change in states of automatic driving of the agricultural machine, whether or not a user is on the agricultural machine, and raising/lowering of the working device.

FIGS. 7A and 7B are flowcharts illustrating an example of operation of the agricultural machine 1. FIGS. 8A to 8C are flowcharts illustrating an example of operation of the mobile terminal (terminal) 50. FIG. 9 is a time chart illustrating an example of a change in states of automatic driving of the agricultural machine 1, whether or not a user is on the agricultural machine 1, and raising/lowering of the working device 2.

In FIG. 9, a setting value of the raised/lowered height of the working device 2 according to an operation position of the raising/lowering operating lever 62*b* is indicated by the thick solid line in a case where the lever 62*b* is operable and operation of the lever 62*b* is enabled, and the setting value is indicated by the line with alternate long and short dashes in a case where the lever 62*b* is operable and operation of the lever 62*b* is disabled. Furthermore, an input value of the raised/lowered height of the working device 2 according to operation of the raising/lowering operating keys B28 and B29 is indicated by the thick solid line in a case where the keys B28 and B29 are operable and operation of the keys B28 and B29 is enabled, the input value is indicated by the line with alternate long and short dashes in a case where the keys B28 and B29 is operable and operation of the keys B28 and B29 is disabled, and the input value is not indicated by a line in a case where the keys B28 and B29 are inoperable. An ON/OFF state of the seat switch 64*a* and the actual raised/lowered height of the working device 2 are indicated by the thick line.

Note that the state where operation of the raising/lowering operating lever 62*b* is enabled means that the user can operate the raising/lowering operating lever 62*b* and the controller 60 causes the coupler 8 or the working device 2 to change the raised/lowered height of the working device 2 in accordance with the operation of the raising/lowering operating lever 62*b* (the operation of the raising/lowering operating lever 62*b* is reflected). The state where operation of the raising/lowering operating lever 62*b* is disabled means that the user can operate the raising/lowering operating lever 62*b* but the controller 60 does not cause the coupler 8 or the working device 2 to change the raised/lowered height of the working device 2 in accordance with the operation of the raising/lowering operating lever 62*b* (the operation of the raising/lowering operating lever 62*b* is not reflected).

The state where operation of the raising/lowering operating keys B28 and B29 is enabled means that the user can operate the raising/lowering operating keys B28 and B29 and the controller 60 causes the coupler 8 or the like (or the working device 2) to change the raised/lowered height of the working device 2 in accordance with the operation of the raising/lowering operating keys B28 and B29 (the operation of the raising/lowering operating keys B28 and B29 is reflected). Furthermore, the state where operation of the raising/lowering operating keys B28 and B29 is disabled means that the user can operate the raising/lowering operating keys B28 and B29 and the controller 60 does not cause the coupler 8 or the like to change the raised/lowered height of the working device 2 in accordance with the operation of the raising/lowering operating keys B28 and B29 (the operation of the raising/lowering operating keys B28 and B29 is not reflected).

For example, a disable flag corresponding to the raising/lowering operating lever 62*b* and a disable flag corresponding to the raising/lowering operating keys B28 and B29 are prepared in a predetermined storage region of the internal memory of the controller 60, and the controller 60 causes disabling of operation of the raising/lowering operating lever 62*b* and disabling of operation of the raising/lowering operating keys B28 and B29 to be stored in the storage 53 by turning the disable flags ON. Furthermore, the controller 60 causes enabling of operation of the raising/lowering operating lever 62*b* and enabling of operation of the raising/lowering operating keys B28 and B29 to be stored by turning the disable flags OFF. Then, when the raising/lowering operating lever 62*b* or the raising/lowering operating keys B28 and B29 are operated, the controller 60 checks whether operation of the raising/lowering operating lever 62*b* or the raising/lowering operating keys B28 and B29 is disabled or enabled from an ON/OFF state of a corresponding disable flag.

In the agricultural machine 1, when automatic driving (automatic traveling work mode) of the agricultural machine 1 is started (S1 in FIG. 7A, time T1 in FIG. 9), the controller 60 causes the communicator 66 to transmit an automatic driving start notification (S2 in FIG. 7A). Then, the controller 60 checks an ON/OFF state of the seat switch (SW) 64*a*, determines whether or not the user is on the agricultural machine 1 from a result of the checking, and causes a result of the determination to be stored in the internal memory (S3*a*). The controller 60 determines that the user is on the agricultural machine 1 in a case where the seat switch 64*a* is ON, and determines that the user is not on the agricultural machine 1 in a case where the seat switch 64*a* is OFF. Next, the controller 60 reads the storage contents in the internal memory, and in a case where the controller 60 confirms that the user is on the agricultural machine 1 (S3*b*: YES), the controller 60 enables operation of the raising/lowering operating lever 62*b* provided in or on the agricultural machine 1, disables operation of the raising/lowering operating keys B28 and B29 displayed on the mobile terminal 50, and causes the communicator 66 to transmit a disable notification indicating that the operation of the raising/lowering operating keys B28 and B29 is disabled to the mobile terminal 50 (S4).

Then, for example, when the user on the agricultural machine 1 operates the raising/lowering operating lever 62*b* to change the raised/lowered height of the working device 2, the controller 51 detects operation of the raising/lowering operating lever 62*b* from a detection result of the raising/lowering operation detector 64*c* (S5: YES), detects an operation position of the raising/lowering operating lever 62*b*, and calculates a setting value of the raised/lowered height of the working device 2 according to the operation position (S6). Then, the controller 60 controls the coupler 8 or the like to change the raised/lowered height of the working device 2 so that the calculated setting value (the changed setting value) and the actual raised/lowered height of the working device 2 detected by the raised/lowered height detector 64*b* correspond to each other (S7).

Note that the case where the setting value of the raised/lowered height and the actual raised/lowered height of the working device 2 correspond to each other may include not only a case where the setting value and the actual raised/lowered height completely match each other (the setting value (%)=the actual raised/lowered height (%)), but also a case where the setting value and the actual raised/lowered height are similar to such a degree that a difference between the setting value and the actual raised/lowered height is less than a predetermined value (the setting value (%)≈the actual raised/lowered height (%), that is, the setting value and the actual raised/lowered height substantially match). The same applies to a relationship between an input value of the raised/lowered height of the working device 2 and the setting value or the actual raised/lowered height, which will be described later.

On the other hand, in a case where the user is not on the agricultural machine 1 (S3*b*: NO), the controller 60 disables operation of the raising/lowering operating lever 62*b*, enables operation of the raising/lowering operating keys B28 and B29, and causes the communicator 66 to transmit an enable notification indicating that operation of the raising/lowering operating keys B28 and B29 is enabled to the mobile terminal 50 (S8). Then, the controller 60 causes the raising/lowering operation detector 64*c* to detect an operation position of the raising/lowering operating lever 62*b*, and calculates a setting value of the raised/lowered height of the working device 2 according to the operation position (S9), and causes the communicator 66 to transmit the setting value to the mobile terminal 50 (S10). In this case, the setting value of the raised/lowered height of the working device 2 based on the raising/lowering operating lever 62*b* corresponds to the actual raised/lowered height of the working device 2 (time T1 in FIG. 9: the setting value 30%=the actual raised/lowered height 30%).

In the mobile terminal 50, the traveling control screen D8 (FIG. 4) is displayed by the display operating device 52 (S31 in FIG. 8A), and when the automatic driving start notification is received from the controller 60 by the communication device 54 (S32), the controller 51 determines that automatic driving of the agricultural machine 1 has started. Then, in a case where the disable notification is received from the controller 60 by the communication device 54 (S33: YES), the controller 51 causes information indicating that operation of the raising/lowering operating keys B28 and B29 is disabled to be stored in the storage 53 (S34). In a case where the enable notification is received from the controller 60 by the communication device 54 (S33: YES), the controller 51 causes information indicating that operation of the raising/lowering operating keys B28 and B29 is enabled to be stored in the storage 53 (S34).

When the setting value of the raised/lowered height of the working device 2 is received by the communication device 54 (S35: YES), the controller 51 causes the setting value to be stored in the storage 53, and updates (changes) an input value (initial input value) of the raised/lowered height of the working device 2 stored in advance in the storage 53 so that the input value corresponds to the setting value (S36, time T1 in FIG. 9: the setting value 30%=the input value 30%).

Then, in a case where the raising/lowering operation screen D14 (see, for example, FIG. 6A) is not displayed on the display operating device 52 (S37: NO in FIG. 8A), when the user inputs an instruction to shift to the raising/lowering operation screen D14 (see, for example, FIG. 6A) by performing predetermined operation on the traveling control screen D8 by the display operating device 52 (S38*a*: YES), the controller 51 causes the raising/lowering operation screen D14 to be displayed on the display operating device 52 (S39) and causes the input value of the raised/lowered height of the working device 2 and the actual raised/lowered height of the working device 2 to be displayed on the raising/lowering operation screen D14 (S40). In this case, the controller 51 regards the setting value of the raised/lowered height of the working device 2 stored in the storage 53 as the actual raised/lowered height of the working device 2, causes the raised/lowered height to be displayed by the meter 81 on the raising/lowering operation screen D14, and causes the input value (initial input value) of the raised/lowered height of the working device 2 stored in the storage 53 in accordance with the setting value to be displayed by the cursor 82 on the raising/lowering operation screen D14 (see, for example, FIG. 6A).

Figure 6D:
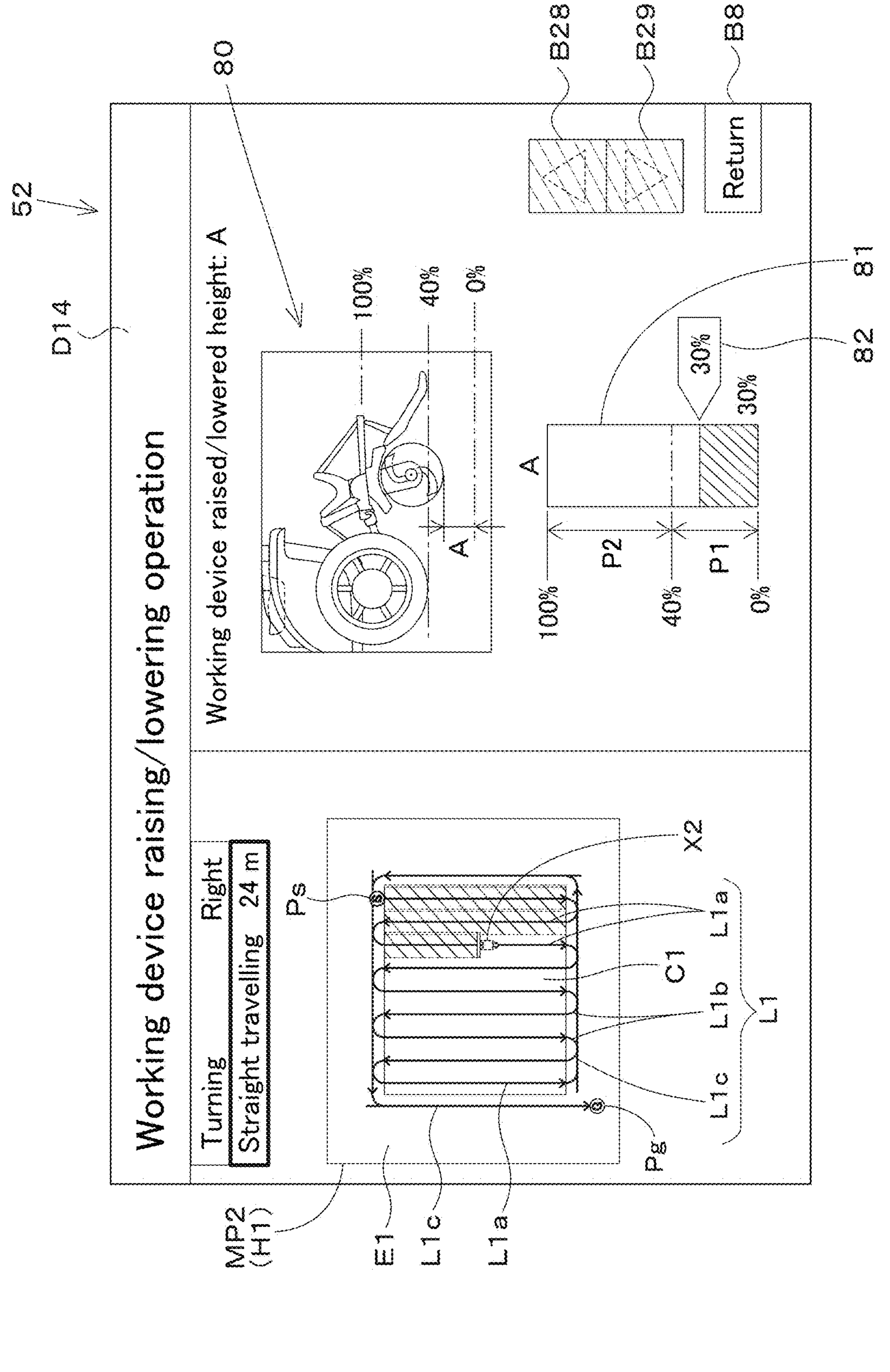
FIG. 6D illustrates an example of the raised/lowered height operation screen.

In a case where information indicating that operation of the raising/lowering operating keys B28 and B29 is disabled is stored in the storage 53 (S41: NO in FIG. 8B), the controller 60 causes the raising/lowering operating keys B28 and B29 to be displayed on the raising/lowering operation screen D14 in an inoperable manner (S42 in FIG. 8B), as illustrated in FIG. 6D. Then, for example, in a case where the user watching the raising/lowering operation screen D14 outside the agricultural machine 1 operates the return key B8 (S43: YES), the controller 51 causes the traveling control screen D8 to be displayed on the display operating device 52 instead of the raising/lowering operation screen D14 (S55).

Also in a case where an automatic driving stopped state is received from the controller 60 by the communication device 54 (S44: YES) before the user operates the return key B8 (S43: NO), the controller 51 causes the traveling control screen D8 to be displayed on the display operating device 52 (S45). Then, the controller 51 causes the received automatic driving stopped state to be displayed on the display operating device 52 (S57 in FIG. 8C), and waits for transmission of an automatic driving interruption instruction or end instruction from the controller 60.

In FIG. 8B, in a case where information indicating that operation of the raising/lowering operating keys B28 and B29 is enabled is stored in the storage 53 (S41: YES), the controller 60 causes the raising/lowering operating keys B28 and B29 to be displayed on the raising/lowering operation screen D14 in an operable manner (S46 in FIG. 8B), as illustrated in FIG. 6A. Then, for example, in a case where the user operates the return key B8 (S48: YES) without operating the raising/lowering operating keys B28 and B29 (S47: NO), the controller 51 causes the traveling control screen D8 to be displayed on the display operating device 52 (S55).

For example, in a case where an automatic driving stopped state is received from the controller 60 by the communication device 54 (S49: YES) before the user operates the raising/lowering operating keys B28 and B29 or the return key B8 (S47: NO, S48: NO), the controller 51 causes the traveling control screen D8 to be displayed on the display operating device 52 (S50). Then, the controller 51 causes the received automatic driving stopped state to be displayed on the display operating device 52 (S57 in FIG. 8C), and waits for transmission of an automatic driving interruption instruction or end instruction from the controller 60. On the other hand, in a case where an automatic driving stopped state is not received from the controller 60 by the communication device 54 (S49: NO in FIG. 8B), process S47 and subsequent processes are performed again.

For example, the user operates the raising/lowering operating keys B28 and B29 to change the raised/lowered height of the working device 2 while the raising/lowering operating keys B28 and B29 are being displayed on the raising/lowering operation screen D14 in an operable manner (S46 in FIG. 8B). In this case, the controller 51 detects the operation of the raising/lowering operating keys B28 and B29 (S47: YES, time T2 in FIG. 9), calculates an input value of the raised/lowered height of the working device 2 according to the operation, and causes the input value to be displayed on the raising/lowering operation screen D14 by the meter 81 and the cursor 82 (S51).

Then, when the user operates the return key B8 and the input value of the raised/lowered height of the working device 2 displayed on the raising/lowering operation screen D14 is decided (S52: YES), the controller 51 updates the input value stored in the storage 53 with the input value (S53, immediately after time T2 in FIG. 9: changes the input value from 30% to 20%), and causes the communication device 54 to transmit an operation signal including the input value to the controller 60 of the agricultural machine 1 (S54 in FIG. 8B). Furthermore, the controller 51 causes the traveling control screen D8 (FIG. 4) to be displayed on the display operating device 52 instead of the raising/lowering operation screen D14 (S55).

In the agricultural machine 1, when the operation signal transmitted from the mobile terminal 50 is received by the communicator 66 (S11: YES in FIG. 7A), the controller 60 controls the coupler 8 or the like to change the raised/lowered height of the working device 2 so that the input value of the raised/lowered height of the working device 2 included in the operation signal and the actual raised/lowered height of the working device 2 detected by the raised/lowered height detector 64*b* correspond to each other (S12, immediately after time T2 in FIG. 9: changes the actual raised/lowered height from 30% to 20%).

The process S3*b* and subsequent processes are repeatedly performed until the automatic driving of the agricultural machine 1 (the traveling body 3) is stopped (S13: NO in FIG. 7A). In the mobile terminal 50, after an operation signal is transmitted on the basis of operation of the raising/lowering operating keys B28 and B29 (S54 in FIG. 8B) and the traveling control screen D8 is displayed (S55), the process S38*a* and subsequent processes in FIG. 8A are repeatedly performed while no automatic driving stopped state is being received from the controller 60 (S56: NO in FIG. 8C). Note that in the process S38*a*, the controller 51 of the mobile terminal 50 waits for input of an instruction to shift to the raising/lowering operation screen D14 (S38*a*: YES) until the stopped state is received from the controller 60 (S38*b*: NO).

Then, for example, in a case where a user on the agricultural machine 1 performs stopping operation by the operating interface 62, the controller 60 stops the automatic driving of the agricultural machine 1 (S13: YES in FIG. 7A), and causes the communicator 66 to notify the mobile terminal 50 of the stopped state (S14). In the mobile terminal 50, when the stopped state is received from the controller 60 by the communication device 54 (S56: YES in FIG. 8C), the controller 51 causes the stopped state to be displayed on the display operating device 52 (S57). In this case, for example, a message indicating that automatic driving stopping operation has been performed in the agricultural machine 1 is displayed on the display operating device 52 (not illustrated).

For example, when a user who has seen the message performs predetermined operation on the display operating device 52, an instruction to interrupt the agricultural work performed by automatic driving of the agricultural machine 1 is input to the mobile terminal 50 (S58: YES in FIG. 8C). In this case, the controller 51 causes the communication device 54 to transmit an interruption instruction indicating that the automatic driving of the agricultural machine 1 has been interrupted to the controller 60 (S59). Then, the controller 51 creates interruption data including information indicating that the automatic driving of the agricultural machine 1 has been interrupted, an interrupted position (stopped position) of the agricultural machine 1 on the traveling route L1, and a status of the agricultural work, and causes the interruption data to be stored (saved) in the storage 53 (S60).

In the agricultural machine 1, when the interruption instruction is received from the mobile terminal 50 by the communicator 66 (S15: YES in FIG. 7B), the automatic driving and the agricultural work are interrupted (S16, time T3 in FIG. 9). During interruption of the automatic driving of the agricultural machine 1, another agricultural work can be performed by the agricultural machine 1 and the working device 2.

Then, in the mobile terminal 50, when the user performs predetermined operation on the display operating device 52, an instruction to resume the interrupted automatic driving and agricultural work of the agricultural machine 1 is input to the mobile terminal 50 (S61 in FIG. 8C). As a result, the controller 51 creates resuming data for resuming the interrupted automatic driving and agricultural work on the basis of corresponding interruption data stored in the storage 53 and causes the communication device 54 to transmit an instruction to resume the automatic driving including the resuming data to the controller 60 (S62). The resuming data includes information indicating that the agricultural work is resumed while automatically driving the agricultural machine 1, the traveling route L1 for the automatic driving, an interrupted position (resuming position) of the agricultural machine 1, and a status of the agricultural work. Then, the process S33 and subsequent processes in FIG. 8A are repeatedly performed.

In the agricultural machine 1, when the resuming instruction is received from the mobile terminal 50 by the communicator 66 (S17: YES in FIG. 7B), the controller 60 resumes the automatic driving and the agricultural work of the agricultural machine 1 and the working device 2 on the basis of the resuming data included in the resuming instruction (S18, time T5 in FIG. 9). Then, the controller 60 checks an ON/OFF state of the seat switch 64*a*, determines whether or not the user is on the agricultural machine 1 from a result of the checking, and causes a result of the determination to be stored in the internal memory (S19*a* in FIG. 7B). Next, the controller 60 reads the storage contents in the internal memory, and in a case where the controller 60 confirms that the user is not on the agricultural machine 1 (S19*b*: NO), the controller 60 disables operation of the raising/lowering operating lever 62*b*, enables operation of the raising/lowering operating keys B28 and B29, and transmits an enable notification to the mobile terminal 50 (S8 in FIG. 7A). Then, the process S9 and subsequent processes are repeatedly performed.

Then, for example, when the raising/lowering operating keys B28 and B29 are operated by the user on the mobile terminal 50 (S47: YES in FIG. 8B, time T6 in FIG. 9), the raised/lowered height of the working device 2 is changed so that an input value of the raised/lowered height of the working device 2 according to the enabled operation and the actual raised/lowered height of the working device 2 correspond to each other (S12 in FIG. 7A, immediately after time T6 in FIG. 9: the actual raised/lowered height is changed from 20% to 10%).

On the other hand, and in a case where the controller 60 confirms that the user is on the agricultural machine 1 by reading the storage contents in the internal memory (S19*b*: YES in FIG. 7B) after the automatic driving is resumed, the controller 60 enables operation of the raising/lowering operating lever 62*b*, disables operation of the raising/lowering operating keys B28 and B29 displayed on the mobile terminal 50, and causes the communicator 66 to transmit a disable notification indicating that operation of the raising/lowering operating keys B28 and B29 is disabled to the mobile terminal 50 (S20). Furthermore, the controller 60 causes the raising/lowering operation detector 64*c* to detect an operation position of the raising/lowering operating lever 62*b*, and calculates a setting value of the raised/lowered height of the working device 2 according to the operation position (S21). Furthermore, the controller 60 causes the raised/lowered height detector 64*b* to detect the actual raised/lowered height of the working device 2 (S22). Then, the controller 60 checks whether or not the setting value of the raised/lowered height of the working device 2 and the actual raised/lowered height correspond to each other.

Although the state where operation of the raising/lowering operating lever 62*b* is disabled continues unless a user gets on the agricultural machine 1 during interruption of the automatic driving of the agricultural machine 1, the raising/lowering operating lever 62*b* is operable. Accordingly, for example, in a case where a user operates the raising/lowering operating lever 62*b* without sitting on the operator's seat 10, the operation position of the raising/lowering operating lever 62*b* (and a setting value according to the operation position) is changed (time T4 in FIG. 9: the setting value is changed from 30% to 25%), but neither the actual raised/lowered height of the working device 2 nor the input value of the raised/lowered height input by the raising/lowering operating keys B28 and B29 are changed.

Accordingly, when the interrupted automatic driving of the agricultural machine 1 is resumed after the user gets on the agricultural machine 1 and the seat switch 64*a* shifts from an OFF state to an ON state (time T9 in FIG. 9), the controller 60 confirms that the setting value of the raised/lowered height of the working device 2 and the actual raised/lowered height of the working device 2 do not correspond to each other (S23: NO in FIG. 7B, time T9 in FIG. 9: the setting value 25%/the actual raised/lowered height 10%). Then, the controller 60 causes the alarm 63 to output, as sound or voice, a warning indicating that the setting value of the raised/lowered height of the working device 2 and the actual raised/lowered height of the working device 2 do not correspond to each other or output a message indicative of the warning by displaying the message on the display operating device 52 of the mobile terminal 50 (S24 in FIG. 7B). In another example, the warning may be displayed on a screen of another display provided in or on the agricultural machine 1. Furthermore, the controller 60 controls the coupler 8 or the like to change the raised/lowered height of the working device 2 so that the setting value and the actual raised/lowered height correspond to each other (S25 in FIG. 7B, immediately after time T9 of FIG. 9, the setting value 25%, the actual raised/lowered height is changed from 10% to 25%).

The controller 60 does not resume (perform) the automatic driving of the agricultural machine 1 while the raised/lowered height of the working device 2 is being changed as described above. The controller 60 resumes (performs) the automatic driving of the agricultural machine 1 and the agricultural work using the working device 2 after confirming that the actual raised/lowered height of the working device 2 detected by the raised/lowered height detector 64*b* corresponds to the setting value of the raised/lowered height of the working device 2 set by the raising/lowering operating lever 62*b*. Then, the process S3*b* and subsequent processes in FIG. 7A are repeatedly performed.

On the other hand, in a case where the setting value of the raised/lowered height of the working device 2 and the actual raised/lowered height of the working device 2 correspond to each other after the automatic driving is resumed (S23: YES in FIG. 7B), the process S3*b* and subsequent processes in FIG. 7A are repeatedly performed without changing the raised/lowered height of the working device 2.

Then, in a case where the user gets on the agricultural machine 1 and there occurs shift from the state where no user is on the agricultural machine 1 to the state where a user is on the agricultural machine 1 (S3*b*: YES in FIG. 7A, time T8 in FIG. 9), operation of the raising/lowering operating lever 62*b* is enabled and operation of the raising/lowering operating keys B28 and B29 is disabled, and a disable notification is transmitted to the mobile terminal 50 (S4 in FIG. 7A, times T8 to T15 in FIG. 9). When the raising/lowering operating lever 62*b* is operated in this situation (S5: YES in FIG. 7A, times T10 and T13 in FIG. 9), the raised/lowered height of the working device 2 is changed so that the setting value of the raised/lowered height of the working device 2 according to the enabled operation and the actual raised/lowered height of the working device 2 correspond to each other (S7 in FIG. 7A, immediately after time T10 of FIG. 9: the actual raised/lowered height is changed from 25% to 15%, immediately after time T13: the actual raised/lowered height is changed from 15% to 20%).

Then, for example, in a case where the user gets off the agricultural machine 1 and there occurs a shift from the state where a user is on the agricultural machine 1 to the state where no user is on the agricultural machine 1 (S3*b*: NO in FIG. 7A, time T15 of FIG. 9), operation of the raising/lowering operating lever 62*b* is disabled and operation of the raising/lowering operating keys B28 and B29 is enabled and an enable notification is transmitted to the mobile terminal 50 when the automatic driving is resumed (S8 in FIG. 7A, time T16 in FIG. 9). Then, the controller 60 calculates a setting value of the raised/lowered height of the working device 2 according to an operation position of the raising/lowering operating lever 62*b* and transmits the setting value to the mobile terminal 50 (S10 in FIG. 7A). Accordingly, in the mobile terminal 50, the setting value of the raised/lowered height of the working device 2 is received (S35: YES in FIG. 8A), and the input value input by the raising/lowering operating keys B28 and B29 stored in the storage 53 of the mobile terminal 50 is updated to correspond to the setting value (S36 in FIG. 8A, immediately after time T16 in FIG. 9: the setting value 20%=the input value 20%).

Then, in the mobile terminal 50, when the raising/lowering operating keys B28 and B29 are operated (S47: YES in FIG. 8B, time T17 in FIG. 9), an operation signal according to the enabled operation is transmitted to the controller 60 (S54 in FIG. 8B). As a result, the operation signal is received by the communicator 66 (S11: YES in FIG. 7A), and the raised/lowered height of the working device 2 is changed so that the input value of the raised/lowered height of the working device 2 included in the operation signal and the actual raised/lowered height of the working device 2 correspond to each other (S12 in FIG. 7A, immediately after time T17 in FIG. 9, the actual raised/lowered height is changed from 20% to 15%).

Then, for example, in a case where the agricultural machine 1 and the working device 2 that are automatically traveling reaches the goal position Pg (FIG. 4) or in a case where the user on the agricultural machine 1 performs stopping operation by the operating interface 62, the controller 60 stops the automatic driving of the agricultural machine 1 (S13: YES in FIG. 7A) and causes the communicator 66 to notify the mobile terminal 50 of the stopped state (S14 in FIG. 7B). In the mobile terminal 50, when the automatic driving stopped state is received by the communication device 54 (S56: YES in FIG. 8C), the controller 51 causes the stopped state to be displayed on the display operating device 52 (S57). In this case, for example, a message indicating that the agricultural machine 1 and the working device 2 have reached the goal position Pg or a message indicating that stopping operation has been performed in the agricultural machine 1 is displayed on the display operating device 52.

When the user who has seen the message performs predetermined operation on the display operating device 52, an instruction to end agricultural work performed by automatic driving of the agricultural machine 1 is input to the mobile terminal 50 (S63: YES). In this case, the controller 51 causes the communication device 54 to transmit an end instruction to end the automatic driving and the agricultural work to the controller 60 (S64), and ends the series of operations. In the agricultural machine 1, when the end instruction is received from the mobile terminal 50 by the communicator 66 (S26: YES in FIG. 7B), the series of operations are ended.

In the above example embodiment, an example in which operation of the raising/lowering operating lever 62*b* and operation of the raising/lowering operating keys B28 and B29 are switched to an enabled state or a disabled state when the automatic driving of the agricultural machine 1 is started or resumed after the ON or OFF state of the seat switch 64*a* (that is, whether or not the user is on the agricultural machine 1) is switched during interruption of the automatic driving of the agricultural machine 1 has been illustrated (times TO, T8, and T15 in FIG. 9), as illustrated in FIG. 9. For example, when the ON or OFF state of the seat switch 64*a* is switched during interruption of the automatic driving of the agricultural machine 1, the controller 60 may instantly switch operation of the raising/lowering operating lever 62*b* and operation of the raising/lowering operating keys B28 and B29 to an enabled state or a disabled state without waiting to resume the automatic driving (a resuming instruction).

Furthermore, when the raising/lowering operating lever 62*b* is operated while the automatic driving of the agricultural machine 1 is being interrupted and operation of the raising/lowering operating lever 62*b* is enabled, the controller 60 may cause the coupler 8 or the like to instantly change the raised/lowered height of the working device 2 in accordance with the operation of the raising/lowering operating lever 62*b* without waiting to resume the automatic driving.

Although FIG. 10A and FIG. 10B illustrate an example of the work position P1 and the non-work position P2 of the working device 2 (the cultivator 2A), the work position and the non-work position of the working device 2 may be, for example, set as appropriate depending on kind or specifications of the working device 2, kind of agricultural work, or the like.

In the above example embodiment, the controller 60 transmits a disable notification or an enable notification of the raising/lowering operating keys B28 and B29 to the mobile terminal 50 in accordance with an ON or OFF state of the seat switch 64*a*, and in a case where the disable notification is received by the mobile terminal 50, the raising/lowering operating keys B28 and B29 are made inoperable so that an operation signal according to operation of the raising/lowering operating keys B28 and B29 is not transmitted to the controller 60. Alternatively, for example, such an arrangement is also possible in which the controller 60 does not transmit a disable notification or an enable notification to the mobile terminal 50, and in a case where the seat switch 64*a* is ON when an operation signal according to operation of the raising/lowering operating keys B28 and B29 is received by the communicator 66, the controller 60 does not receive the operation signal. Furthermore, in a case where the seat switch 64*a* is OFF when an operation signal according to operation of the raising/lowering operating keys B28 and B29 is received by the communicator 66, the controller 60 may receive the operation signal.

Although operation of the raising/lowering operating lever 62*b* or the raising/lowering operating keys B28 and B29 is enabled or disabled in accordance with whether or not a user is on the agricultural machine 1 and the raised/lowered height of the working device 2 is changed by the coupler 8 or the working device 2 in accordance with the enabled operation of the raising/lowering operating lever 62*b* or the raising/lowering operating keys B28 and B29 in the above example embodiment, this does not imply any limitation. For example, an operating device such as an operating manual controller or an operating key that is operable to change a posture of the working device 2 such as a cultivation depth or a Monroe angle of the working device 2 may be provided in or on both of the agricultural machine 1 and the mobile terminal 50, and operation of each of the operating devices may be enabled or disabled in accordance with whether or not a user is on the agricultural machine 1. Then, the posture such as the cultivation depth or the Monroe angle of the working device 2 may be changed by the coupler 8 or the working device 2 in accordance with the enabled operation of the operating device. Instead of the posture of the working device 2, for example, driving and stoppage of the working device 2 or a drive state such as a rotational speed of a rotary device included in the working device 2 may be operated in accordance with enabled operation of an operating device provided in or on both of the agricultural machine 1 and the mobile terminal 50.

The first operating device provided in or on the agricultural machine 1 is not limited to the operating lever 62*b* and may be a hardware switch, button, dial, key, or another kind of operating device or a software switch, button, slider, lever, or another kind of key. The first operating device may be provided in or on a terminal (e.g., a display terminal) mounted on the agricultural machine 1 separately from the mobile terminal 50.

The second operating device provided in or on the mobile terminal 50 is not limited to the operating keys B28 and B29 and may be a software switch, button, dial or slide key or may be a hardware switch, button, dial, key, or another kind of operating device. The second operating device may be provided in or on a stationary terminal instead of the mobile terminal 50.

Although the controller 60 that performs the automatic driving of the agricultural machine 1 controls the coupler 8 or the working device 2 to change the raised/lowered height of the working device 2 or the like in the above example embodiment, a controller different from the controller that performs the automatic driving of the agricultural machine may, for example, cause the working device to work in accordance with operation of an operating device. Furthermore, a driver to cause the working device 2 to perform an action such as raising/lowering, swinging, or horizontal movement may be provided separately from the coupler 8 that couples the agricultural machine 1 and the working device 2.

In the above example embodiment, an example in which in a case where agricultural work is performed while automatically driving the agricultural machine 1 (automatic traveling work mode), operation of the operating device 62*b* or the operating devices B28 and B29 is enabled or disabled in accordance with whether the user is on the agricultural machine 1, and the working device 2 works in accordance with the enabled operation of the operating device 62*b* or the operating devices B28 and B29 has been illustrated. Also in a case where agricultural work is performed while automatically steering the agricultural machine 1 and leaving change of the traveling speed to manual operation (automatic steering work mode) or in a case where agricultural work is performed while manually driving the agricultural machine 1 (manual driving mode), operation of the operating device 62*b* or the operating devices B28 and B29 may be enabled or disabled in accordance with whether the user is on the agricultural machine 1, and the working device 2 may work in accordance with the enabled operation of the operating device 62*b* or the operating devices B28 and B29. In addition, an input value input by the second operating devices B28 and B29 may be changed to correspond to a setting value according to an operation position of the first operating device 62*b*.

The agricultural work assistance system 100 and the agricultural machine 1 according to the present example embodiment described above have the following configurations and produce the following effects.

The agricultural work assistance system 100 according to the present example embodiment includes the coupler 8 to couple the working device 2 to the agricultural machine 1, the controller 60 configured or programmed to control automatic traveling or steering of the agricultural machine to enable the working device to perform agricultural work on an agricultural field, the first operating device (raising/lowering operating lever) 62*b* that is provided in or on the agricultural machine 1 and is operable to cause the working device 2 to work, the second operating device (raising/lowering operating keys) B28, B29 that is operable outside the agricultural machine 1 to cause the working device 2 to work, and the first detector (seat switch) 64*a* to detect whether or not a user is on the agricultural machine 1, in which while the first detector 64*a* is detecting the user on the agricultural machine 1, the working device 2 is capable of working in accordance with operation of the first operating device 62*b* and operation of the second operating device B28, B29 is disabled, and while the first detector 64*a* is detecting no user on the agricultural machine 1, the working device 2 is capable of working in accordance with operation of the second operating device B28, B29 and operation of the first operating device 62*b* is disabled.

The agricultural machine 1 according to the present example embodiment includes the traveling body 3 that is capable of traveling, the coupler 8 to couple the working device 2 to the traveling body 3, the controller 60 configured or programmed to perform agricultural work on an agricultural field by the working device 2 while automatically performing traveling or steering of the traveling body 3, the first operating device 62*b* that is operable to cause the working device 2 to work, and the first detector 64*a* to detect whether or not a user is on the traveling body 3, in which while the first detector 64*a* is detecting the user on the traveling body 3, the controller 60 is configured or programmed to cause the working device 2 to work in accordance with operation of the first operating device 62*b* and disable operation of the second operating device B28, B29 to cause the working device 2 to work outside the agricultural machine 1, and while the first detector 64*a* is detecting no user on the traveling body 3, the controller 60 is configured or programmed to cause the working device 2 to work in accordance with operation of the second operating device B28, B29 and disable operation of the first operating device 62*b*.

According to the configuration, the working device 2 is operable by the first operating device 62*b* provided in or on the agricultural machine 1 or the second operating device B28, B29 that is operable outside the agricultural machine 1 depending on whether or not a user is on the agricultural machine 1, and the working device 2 is not operated by these operating devices at the same time. It is therefore possible to prevent or reduce occurrence of a situation where an operating state of the first operating device 62*b* does not correspond to an operating state of the second operating device B28, B29 or does not correspond to an actual operating state of the working device 2, thereby preventing a user from being confused when operating the working device 2 by the operating device 62*b* or the operating device B28, B29. Furthermore, for example, even in a case where the second operating device B28, B29 outside the agricultural machine 1 is operated by another person contrary to user's intention in a case where the user is on the agricultural machine 1 that is automatically travelling, the working device 2 does not work in accordance with the operation, and it is possible to prevent user's confusion. Furthermore, the working device 2 can be operated by the first operating device 62*b* on the agricultural machine 1, and the working device 2 can be operated by the second operating device B28, B29 outside the agricultural machine 1. This can improve convenience.

In the present example embodiment, the first operating device 62*b* and the second operating device B28, B29 are operable to change a posture of the working device 2, and depending on a detection result of the first detector 64*a*, the controller 60 is configured or programmed to change the posture of the working device 2 in accordance with operation of one of the first operating device 62*b* and the second operating device B28, B29 and does not change the posture of the working device 2 in accordance with operation of the other one of the first operating device 62*b* and the second operating device B28, B29 during automatic driving in which the agricultural work is performed by the working device 2 while the agricultural machine 1 is traveling. With this configuration, the posture of the working device 2 is changeable by the first operating device 62*b* or the second operating device B28, B29 depending on whether or not a user is on the agricultural machine 1 during automatic driving of the agricultural machine 1, and the posture of the working device 2 is not operated by these operating devices at the same time. This makes it possible to prevent the user from being confused when operating the posture of the working device 2 by the operating device 62*b* or the operating device B28, B29, thereby improving convenience.

In the present example embodiment, the agricultural work assistance system 100 further includes the communicator 66 to wirelessly communicate with the terminal 50, the communicator 66 being provided in or on the agricultural machine 1, in which the second operating device B28, B29 is provided in or on the terminal 50, the coupler 8 is operable to change a posture of the working device 2, while the first detector 64*a* is detecting no user on the agricultural machine 1, the terminal 50 is operable to transmit an operation signal according to operation of the second operating device B28, B29, and the controller 60 is configured or programmed to cause the communicator 66 to receive the operation signal and cause the coupler 8 to change the posture of the working device 2 on the basis of the operation signal, and while the first detector 64*a* is detecting the user on the agricultural machine 1, the terminal 50 does not transmit an operation signal according to operation of the second operating device B28, B29 even in a case where the second operating device B28, B29 is operated or the controller 60 does not receive the operation signal. With this configuration, the posture of the working device 2 is changeable by the first operating device 62*b* or the second operating device B28, B29 depending on whether or not a user is on the agricultural machine 1, and it is possible to prevent the posture of the working device 2 from being operated by these operating devices at the same time with certainty.

In the present example embodiment, in a case where the first detector 64*a* detects transition from a state where no user is on the agricultural machine 1 to a state where the user is on the agricultural machine 1, the controller 60 is configured or programmed to cause the communicator 66 to transmit a disable notification indicating that operation of the second operating device B28, B29 is disabled, and the terminal 50 makes the second operating device B28, B29 inoperable upon receipt of the disable notification. With this configuration, the working device 2 can be operated by the first operating device 62*b* of the agricultural machine 1 in a case where a user is on the agricultural machine 1, and it is possible to prevent another user from operating the working device 2 by the second operating device B28, B29 of the terminal 50 with certainty.

In the present example embodiment, the agricultural work assistance system 100 further includes the second detector (raised/lowered height detector) 64*b* to detect an actual posture of the working device 2, in which while the first detector 64*a* is detecting no user on the agricultural machine 1, the terminal 50 is operable to calculate, upon operation of the second operating device B28, B29, an input value of the posture of the working device 2 according to the operation and transmits an operation signal including the input value, and when the operation signal is received by the communicator 66, the controller 60 is configured or programmed to change the posture of the working device 2 so that the input value included in the operation signal and the actual posture of the working device 2 detected by the second detector 64*b* correspond to each other. With this configuration, in a case where no user is on the agricultural machine 1, the input value of the posture of the working device 2 input by the second operating device B28, B29 of the terminal 50 and the actual posture of the working device 2 correspond to each other, and therefore it is possible to operate the posture of the working device 2 by the second operating device B28, B29 properly with certainty.

In the present example embodiment, the agricultural work assistance system 100 further includes the third detector (raising/lowering operation detector) 64*c* to detect an operation position of the first operating device 62*b*, in which while the first detector 64*a* is detecting the user on the agricultural machine 1, the controller 60 is configured or programmed to calculate, upon operation of the first operating device 62*b*, a setting value of the posture of the working device 2 according to the operation position of the first operating device 62*b* detected by the third detector 64*c*, and change the posture of the working device 2 so that the setting value and the actual posture of the working device 2 detected by the second detector 64*b* correspond to each other. With this configuration, in a case where a user is on the agricultural machine 1, the setting value of the posture of the working device 2 according to the operation position of the first operating device 62*b* of the agricultural machine 1 and the actual posture of the working device 2 correspond to each other, and therefore it is possible to operate the posture of the working device 2 by the first operating device 62*b* properly with certainty.

In the present example embodiment, while the first detector 64*a* is detecting no user on the agricultural machine 1, the terminal 50 is operable to calculate, upon operation of the second operating device B28, B29, an input value of the posture of the working device 2 according to the operation and cause the input value to be stored in the storage 53, and in a case where the first detector 64*a* detects transition from the state where a user is on the agricultural machine 1 to the state where no user is on the agricultural machine 1, the controller 60 is configured or programmed to calculate the setting value of the posture of the working device 2 according to the operation position of the first operating device 62*b* detected by the third detector 64*c* and cause the communicator 66 to transmit the setting value, and the terminal 50 changes, upon receipt of the setting value of the posture of the working device 2, the input value of the posture of the working device 2 stored in the storage 53 so that the input value corresponds to the setting value.

With the configuration, even in a case where the setting value of the posture of the working device 2 according to the operation position of the first operating device 62*b* ceases to correspond to the input value of the posture of the working device 2 stored in the storage 53 of the terminal 50, the input value can be updated to correspond to the setting value, and the updated input value can be set as an initial input value of the second operating device B28, B29. This makes it possible to prevent a user from being confused when operating the posture of the working device 2 by the operating device 62*b* or the operating device B28, B29, thereby preventing the working device 2 from taking a posture that is not intended by the user.

In the present example embodiment, the agricultural work assistance system 100 further includes the notifier 63, 52 (alarm 63, display operating device 52) to output a warning, in which in a case where the first detector 64*a* detects transition from the state where no user is on the agricultural machine 1 to the state where a user is on the agricultural machine 1, the controller 60 is configured or programmed to calculate the setting value of the posture of the working device 2 according to the operation position of the first operating device 62*b* detected by the third detector 64*c*, and in a case where the setting value and the actual posture of the working device 2 detected by the second detector 64*b* do not correspond to each other, cause the notifier 63, 52 to output a warning and changes the posture of the working device 2 so that the setting value and the actual raised/lowered height correspond to each other.

With the configuration, even in a case where the setting value of the posture of the working device 2 according to the operation position of the first operating device 62*b* ceases to correspond to the actual posture of the working device 2, the posture of the working device 2 is automatically changed to correspond to the setting value, and therefore it is possible to prevent a user from being confused when operating the posture of the working device 2 by the first operating device 62*b*. Furthermore, it is possible to prevent the working device 2 from taking a posture that is not intended by the user. Furthermore, by outputting a warning by the notifier 63, 52 when the posture of the working device 2 is automatically changed to correspond to the setting value, user's confusion can be prevented while allowing the user to recognize that the working device 2 operates in a posture that is not intended by the user.

In the present example embodiment, in a case where the first detector 64*a* detects transition from the state where no user is on the agricultural machine 1 to the state where a user is on the agricultural machine 1, the controller 60 is configured or programmed to calculate the setting value of the posture of the working device 2 according to the operation position of the first operating device 62*b* detected by the third detector 64*c* and does not perform automatic driving of the agricultural machine 1 in a case where the setting value and the actual posture of the working device 2 detected by the second detector 64*b* do not correspond to each other. This can prevent the working device 2 from taking a posture that is not intended by the user when the user operates the posture of the working device 2 by the operating device 62*b* or the operating device B28, B29 during automatic driving of the agricultural machine 1, thereby preventing user's confusion. The agricultural work can be stably performed by the working device 2 that has taken a posture intended by the user.

In the present example embodiment, the controller 60 is configured or programmed to cause the communicator 66 to transmit the actual posture of the working device 2 detected by the second detector 64*b*, and the terminal 50 includes the display (display operating device) 52 that receives the actual posture of the working device 2 and displays the actual posture and an input value of the posture of the working device 2 according to operation of the second operating device B28, B29. This allows a user to operate the posture of the working device 2 by the second operating device B28, B29 easily with certainty while visually recognizing the actual posture of the working device 2 and the input value of the posture of the working device 2 according to operation of the second operating device B28, B29 that are displayed on the display unit 52, thereby improving convenience.

In the present example embodiment, the coupler 8 is operable to change a raised/lowered height as the posture of the working device 2 by raising or lowering the working device 2, the first operating device 62*b* is an operating device (raising/lowering operating lever 62*b*) that is operable by a user on the agricultural machine 1 to change the raised/lowered height of the working device 2 and holds an operation position according to the operation, and the second operating device B28, B29 is an operating key (raising/lowering operating keys B28 and B29) that is provided on the terminal 50 carried by the user and is operable to change the raised/lowered height of the working device 2.

According to the configuration, the raised/lowered height of the working device 2 can be operated by the operating device 62*b* of the agricultural machine 1 while the user is on the agricultural machine 1, and the raised/lowered height of the working device 2 can be operated by the operating key B28, B29 on the terminal 50 moved to any position while the user is not on the agricultural machine 1. This can improve convenience. Furthermore, it is possible to prevent the working device 2 from moving to a raised/lowered height that is not intended by the user when the user operates the raised/lowered height of the working device 2 by the operating device 62*b* or the operating key B28, B29. This can prevent user's confusion.

In the present example embodiment, the agricultural machine 1 further includes the communicator 66 to wirelessly communicate with the terminal 50, and the second detector 64*b* to detect an actual posture of the working device 2, in which the coupler 8 changes the posture of the working device 2, and while the first detector 64*a* is detecting no user on the traveling body 3, the controller 60 is configured or programmed to cause the coupler 8 to, when an operation signal transmitted from the terminal 50 in accordance with operation of the second operating device B28, B29 is received by the communicator 66, change the posture of the working device 2 so that an input value of the posture of the working device 2 according to the operation of the second operating device B28, B29 included in the operation signal and the actual posture of the working device 2 detected by the second detector 64*b* correspond to each other. With the configuration, while no user is on the agricultural machine 1, the input value of the posture of the working device 2 input by the second operating device B28, B29 of the terminal 50 and the actual posture of the working device 2 correspond to each other, and the posture of the working device 2 can be operated by the second operating device B28, B29 properly with certainty.

In the present example embodiment, the agricultural machine 1 further includes the third detector 64*c* to detect an operation position of the first operating device 62*b*, in which in a case where the first detector 64*a* detects transition from the state where no user is on the traveling body 3 to the state where a user is on the traveling body 3, the controller 60 is configured or programmed to calculate a setting value of the posture of the working device 2 according to the operation position of the first operating device 62*b* detected by the third detector 64*c*, and in a case where the setting value and the actual posture of the working device 2 detected by the second detector 64*b* do not correspond to each other, causes the notifier 63, 52 to output a warning and causes the coupler 8 to change the posture of the working device 2 so that the setting value and the actual raised/lowered height correspond to each other.

With the configuration, the posture of the working device 2 is automatically changed to correspond to the setting value and a warning is output by the notifier 63, 52 even in a case where the setting value of the posture of the working device 2 according to the operation position of the first operating device 62*b* ceases to correspond to the actual posture of the working device 2. This can prevent a user from being confused when operating the posture of the working device 2 by the first operating device 62*b* and prevent the working device 2 from taking a posture that is not intended by the user.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural work assistance system comprising:

a coupler to couple a working device to an agricultural machine;

a controller configured or programmed to control automatic traveling or steering of the agricultural machine to enable the working device to perform agricultural work on an agricultural field;

a first operating device that is provided in or on the agricultural machine and is operable to cause the working device to work;

a second operating device that is operable outside the agricultural machine to cause the working device to work; and a first detector to detect whether or not a user is on the agricultural machine; wherein while the first detector is detecting the user on the agricultural machine, the working device is capable of working in accordance with operation of the first operating device and operation of the second operating device is disabled; and while the first detector is detecting no user on the agricultural machine, the working device is capable of working in accordance with operation of the second operating device and operation of the first operating device is disabled.

2. The agricultural work assistance system according to claim 1, wherein the first operating device and the second operating device are operable to change a posture of the working device; and depending on a detection result of the first detector, the controller is configured or programmed to:

change the posture of the working device in accordance with operation of one of the first operating device and the second operating device; and not change the posture of the working device in accordance with operation of an other one of the first operating device and the second operating device during automatic driving in which the agricultural work is performed by the working device while the agricultural machine is traveling.

3. The agricultural work assistance system according to claim 1, further comprising a communicator to wirelessly communicate with a terminal, the communicator being provided in or on the agricultural machine; wherein the second operating device is provided in or on the terminal;

the coupler is operable to change a posture of the working device;

while the first detector is detecting no user on the agricultural machine, the terminal is operable to transmit an operation signal according to operation of the second operating device, and the controller is configured or programmed to cause the communicator to receive the operation signal and cause the coupler to change the posture of the working device on a basis of the operation signal; and while the first detector is detecting the user on the agricultural machine, the terminal does not transmit an operation signal according to operation of the second operating device even in a case where the second operating device is operable or the controller does not receive the operation signal.

4. The agricultural work assistance system according to claim 1, further comprising a communicator to wirelessly communicate with a terminal, the communicator being provided in or on the agricultural machine; wherein the second operating device is provided in or on the terminal;

in a case where the first detector detects a transition from a state where no user is on the agricultural machine to a state where the user is on the agricultural machine, the controller is configured or programmed to cause the communicator to transmit a disable notification indicating that operation of the second operating device is disabled, and the terminal is operable to make the second operating device inoperable upon receipt of the disable notification.

5. The agricultural work assistance system according to claim 3, further comprising a second detector to detect an actual posture of the working device; wherein while the first detector is detecting no user on the agricultural machine, the terminal is operable to calculate, upon operation of the second operating device, an input value of the posture of the working device according to the operation and transmit an operation signal including the input value, and when the operation signal is received by the communicator, the controller is configured or programmed to change the posture of the working device so that the input value included in the operation signal and the actual posture of the working device detected by the second detector correspond to each other.

6. The agricultural work assistance system according to claim 2, further comprising:

a second detector to detect an actual posture of the working device; and a third detector to detect an operation position of the first operating device; wherein while the first detector is detecting the user on the agricultural machine, the controller is configured or programmed to calculate, upon operation of the first operating device, a setting value of the posture of the working device according to the operation position of the first operating device detected by the third detector, and change the posture of the working device so that the setting value and the actual posture of the working device detected by the second detector correspond to each other.

7. The agricultural work assistance system according to claim 6, wherein while the first detector is detecting no user on the agricultural machine, the terminal is operable to calculate, upon operation of the second operating device, an input value of the posture of the working device according to the operation and cause the input value to be stored in a storage; and in a case where the first detector detects transition from the state where the user is on the agricultural machine to the state where no user is on the agricultural machine, the controller is configured or programmed to calculate the setting value of the posture of the working device according to the operation position of the first operating device detected by the third detector and cause the communicator to transmit the setting value, and the terminal is operable to change, upon receipt of the setting value of the posture of the working device, the input value of the posture of the working device stored in the storage so that the input value corresponds to the setting value.

8. The agricultural work assistance system according to claim 6, further comprising a notifier to output a warning; wherein in a case where the first detector detects a transition from the state where no user is on the agricultural machine to the state where the user is on the agricultural machine, the controller is configured or programmed to calculate the setting value of the posture of the working device according to the operation position of the first operating device detected by the third detector, and in a case where the setting value and the actual posture of the working device detected by the second detector do not correspond to each other, cause the notifier to output a warning and change the posture of the working device so that the setting value and an actual raised/lowered height correspond to each other.

9. The agricultural work assistance system according to claim 6, wherein in a case where the first detector detects a transition from the state where no user is on the agricultural machine to the state where the user is on the agricultural machine, the controller is configured or programmed to calculate the setting value of the posture of the working device according to the operation position of the first operating device detected by the third detector and does not perform automatic driving of the agricultural machine in a case where the setting value and the actual posture of the working device detected by the second detector do not correspond to each other.

10. The agricultural work assistance system according to claim 5, wherein the controller is configured or programmed to cause the communicator to transmit the actual posture of the working device detected by the second detector; and the terminal includes a display to receive the actual posture of the working device and display the actual posture and an input value of the posture of the working device according to operation of the second operating device.

11. The agricultural work assistance system according to claim 1, wherein the coupler is operable to change a raised/lowered height as the posture of the working device by raising or lowering the working device;

the first operating device includes an operating structure that is operable by a user on the agricultural machine to change the raised/lowered height of the working device and hold an operation position according to the operation; and the second operating device includes an operating key that is provided in or on a terminal carried by the user and is operable to change the raised/lowered height of the working device.

12. An agricultural machine comprising:

a traveling body that is capable of traveling;

a coupler to couple a working device to the traveling body;

a controller configured or programmed to control automatic traveling or steering of the agricultural machine to enable the working device to perform agricultural work on an agricultural field;

a first operating device that is operable to cause the working device to work; and a first detector to detect whether or not a user is on the traveling body; wherein while the first detector is detecting a user on the traveling body, the controller is configured or programmed to cause the working device to work in accordance with operation of the first operating device and disable operation of a second operating device to cause the working device to work outside the agricultural machine; and while the first detector is detecting no user on the traveling body, the controller is configured or programmed to cause the working device to work in accordance with operation of the second operating device and disable operation of the first operating device.

13. The agricultural machine according to claim 12, wherein the first operating device is operable by the user on the agricultural machine to change a posture of the working device and hold an operation position according to the operation; and the second operating device is provided in or on a terminal carried by the user and is operable to change the posture of the working device; and depending on a detection result of the first detector, the controller is configured or programmed to:

change the posture of the working device in accordance with operation of one of the first operating device and the second operating device; and not change the posture of the working device in accordance with operation of an other one of the first operating device and the second operating device during automatic driving in which the agricultural work is performed by the working device while the traveling body is traveling.

14. The agricultural machine according to claim 13, further comprising:

a communicator to wirelessly communicate with the terminal; and a second detector to detect an actual posture of the working device; wherein the coupler is operable to change the posture of the working device; and while the first detector is detecting no user on the traveling body, the controller configured or programmed to cause the coupler to, when an operation signal transmitted from the terminal in accordance with operation of the second operating device is received by the communicator, change the posture of the working device so that an input value of the posture of the working device according to the operation of the second operating device included in the operation signal and the actual posture of the working device detected by the second detector correspond to each other.

15. The agricultural machine according to claim 14, further comprising:

a third detector to detect an operation position of the first operating device; and a notifier to output a warning; wherein in a case where the first detector detects a transition from the state where no user is on the traveling body to the state where the user is on the traveling body, the controller is configured or programmed to calculate a setting value of the posture of the working device according to the operation position of the first operating device detected by the third detector, and in a case where the setting value and the actual posture of the working device detected by the second detector do not correspond to each other, cause the notifier to output a warning and cause the coupler to change the posture of the working device so that the setting value and the actual raised/lowered height correspond to each other.

* * * * *